(12) United States Patent
Kim et al.

(10) Patent No.: US 8,659,729 B2
(45) Date of Patent: Feb. 25, 2014

(54) LIQUID CRYSTAL DISPLAY

(75) Inventors: Heeseop Kim, Hwaseong-si (KR);
Ohjeong Kwon, Hwaseong-si (KR); Jae Hong Park, Hwaseong-si (KR);
Hyeokjin Lee, Seongnam-si (KR);
Sung-Jae Yun, Hwaseong-si (KR); Suk Choi, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 62 days.

(21) Appl. No.: 13/227,244

(22) Filed: Sep. 7, 2011

(65) Prior Publication Data

US 2012/0075542 A1     Mar. 29, 2012

(30) Foreign Application Priority Data

Sep. 27, 2010   (KR) .......................... 10-2010-0093410

(51) Int. Cl.
*G02F 1/1337*     (2006.01)
*G02F 1/1343*     (2006.01)

(52) U.S. Cl.
USPC ............ 349/129; 349/130; 349/139; 349/141

(58) Field of Classification Search
USPC ...................... 349/38–39, 130, 141, 129, 139
See application file for complete search history.

(56) References Cited

U.S. PATENT DOCUMENTS

| 2008/0278651 | A1 | 11/2008 | Lee et al. |
| 2009/0073367 | A1* | 3/2009 | Woo et al. ...................... 349/142 |
| 2009/0102773 | A1 | 4/2009 | Um et al. |
| 2009/0185091 | A1* | 7/2009 | Kim et al. ........................ 349/39 |
| 2010/0165259 | A1* | 7/2010 | Nakanishi et al. .............. 349/86 |

FOREIGN PATENT DOCUMENTS

| JP | 2002-296608 | 10/2002 |
| JP | 2003-196023 | 7/2003 |
| JP | 2008-032756 | 2/2008 |
| JP | 2009-069811 A | 4/2009 |
| KR | 1020080099038 A | 11/2008 |
| KR | 1020080114353 A | 12/2008 |
| KR | 1020090027920 A | 3/2009 |
| KR | 1020090040652 A | 4/2009 |
| KR | 1020090129774 A | 12/2009 |
| KR | 1020100031242 A | 3/2010 |

* cited by examiner

*Primary Examiner* — Michael Caley
*Assistant Examiner* — Kendrick Hsu
(74) *Attorney, Agent, or Firm* — Innovation Counsel LLP

(57) ABSTRACT

A liquid crystal display includes a first substrate, a first pixel electrode, a second pixel electrode, a second substrate, and a liquid crystal layer. The first pixel electrode is formed on the first substrate. The second pixel electrode overlaps with at least a part of the pixel electrode with the first insulating layer interposed therebetween. The second pixel electrode has a plurality of elongated openings and applies a voltage to the liquid crystal layer that is different from the voltage the first pixel electrode applies to the liquid crystal layer.

25 Claims, 39 Drawing Sheets

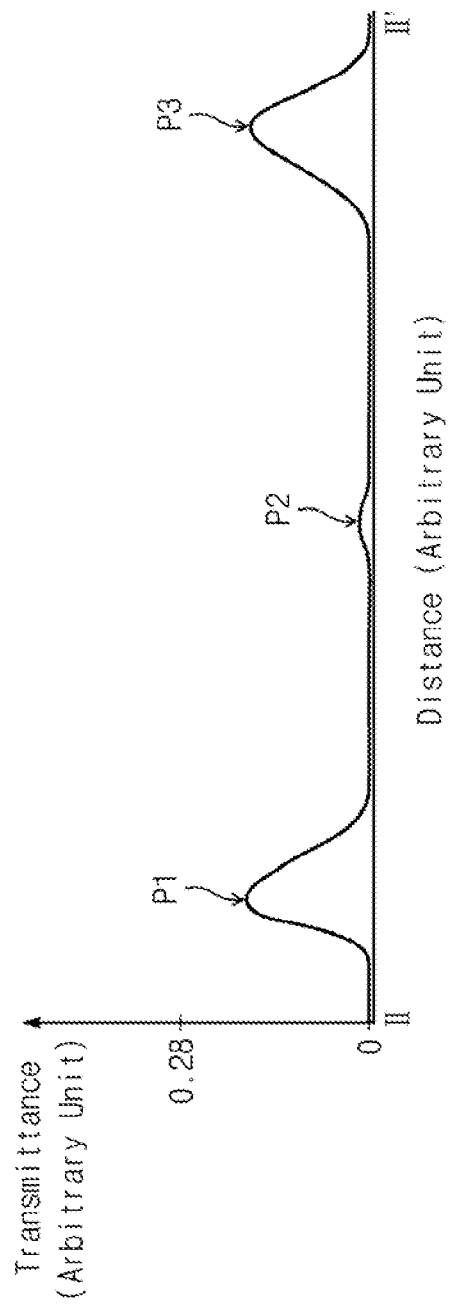

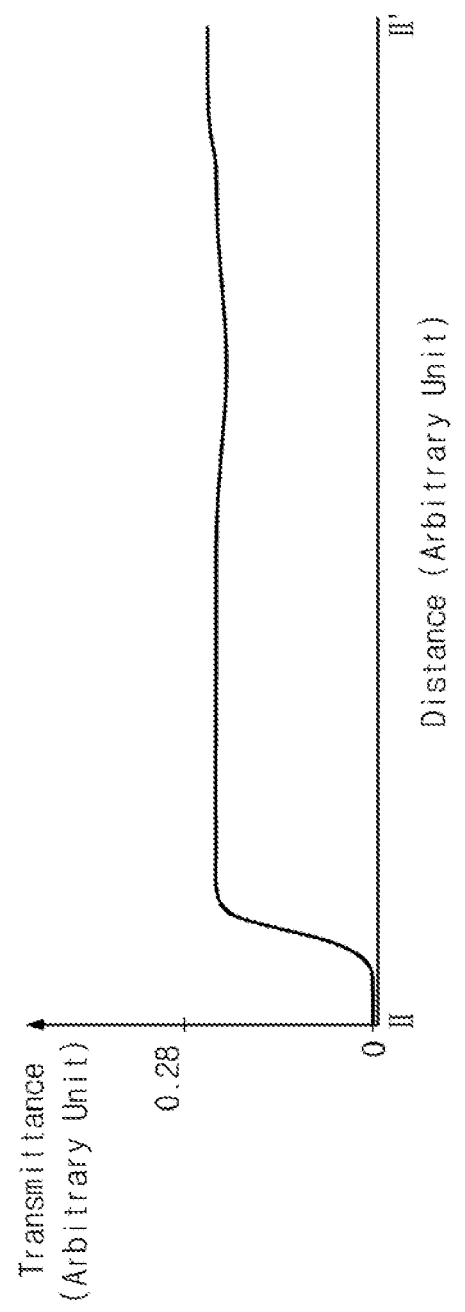

US 8,659,729 B2

LIQUID CRYSTAL DISPLAY

CROSS-REFERENCE TO RELATED APPLICATION

This application relies for priority upon Korean Patent Application No. 10-2010-0093410 filed on Sep. 27, 2010, the contents of which are herein incorporated by reference in their entirety.

BACKGROUND OF THE INVENTION

1. Field of the Invention

The present invention relates to a liquid crystal display. More particularly, the present invention relates to a liquid crystal display capable of reducing texture defects.

2. Description of the Related Art

A liquid crystal display (LCD) is a display apparatus in which a liquid crystal layer is interposed between two transparent substrates. The liquid crystal layer is used to adjust light transmittance for each pixel, thereby displaying desired images.

In a VA LCD (vertical alignment mode LCD), liquid crystal molecules are vertically aligned (i.e. perpendicular to the substrates) when no electric field is applied, and rotate to a horizontal position when an electric field is applied between the two substrates. An image is displayed by transmitting light through the liquid crystal molecules. A PVA LCD (patterned vertical alignment mode LCD), which is a particular type of VA LCD, aligns the liquid crystal molecules in different directions from each other by using a patterned pixel electrode to form liquid crystal domains, thereby widening the viewing angle of the LCD. However, if the pixel electrode is patterned with a plurality of micro-slits, the liquid crystal molecules aligned at the middle of the micro-slits may be difficult to control.

SUMMARY OF THE INVENTION

An LCD capable of reducing texture defect is provided.

In one aspect, the LCD includes a first substrate, a first pixel electrode formed on the first substrate, a second pixel electrode overlapping with at least a part of the first pixel electrode and including one or more elongated opening, a passivation layer interposed between the first pixel electrode and the second pixel electrode, a second substrate and a liquid crystal layer including vertically aligned liquid crystal molecules between the first and second substrates, wherein first effective voltage that is applied to the liquid crystal layer by the first pixel electrode is different from a second effective voltage that is applied to the liquid crystal layer by the second pixel electrode.

A voltage applied to the first pixel electrode is a first voltage and a voltage applied to the second pixel electrode is a second voltage. The first effective voltage is applied to the liquid crystal layer when the first voltage is applied to the first pixel electrode and the second effective voltage is applied to the liquid crystal layer when the second voltage is applied to the second pixel electrode, and the first and second effective voltages satisfies $0.3V_1 < V_2 < 0.9V_1$.

The first voltage may be identical to or different from the second voltage.

When the first and second voltages having the same level are applied to the first and second pixel electrodes, the first and second effective voltages vary depending on the thickness of the passivation layer. Additionally, the first voltage is identical to the first effective voltage and the second effective voltage is defined as equation 1.

$$V_2 = V_t \left(1 + \frac{d_p/d_{LC}}{\varepsilon_p/\varepsilon_{LC}}\right)^{-1}, \quad \text{Equation 1}$$

In Equation 1, $V_t$ is the second voltage, $d_{LC}$ is a thickness of the liquid crystal layer, $\varepsilon_p$ is a dielectric constant of the passivation layer, $d_p$ is a thickness of the passivation layer, and $\varepsilon_{LC}$ is a dielectric constant of the liquid crystal layer.

The pixel may have a charge sharing structure, so the first voltage may have a level different from that of the second voltage.

BRIEF DESCRIPTION OF THE DRAWINGS

The above and other advantages will become readily apparent by reference to the following detailed description when considered in conjunction with the accompanying drawings wherein:

FIGS. 7A and 7B are graphs showing transmittance as a function of time after a voltage has been applied in an LCD according to a first exemplary embodiment;

DESCRIPTION OF THE EMBODIMENTS

Figure 1:
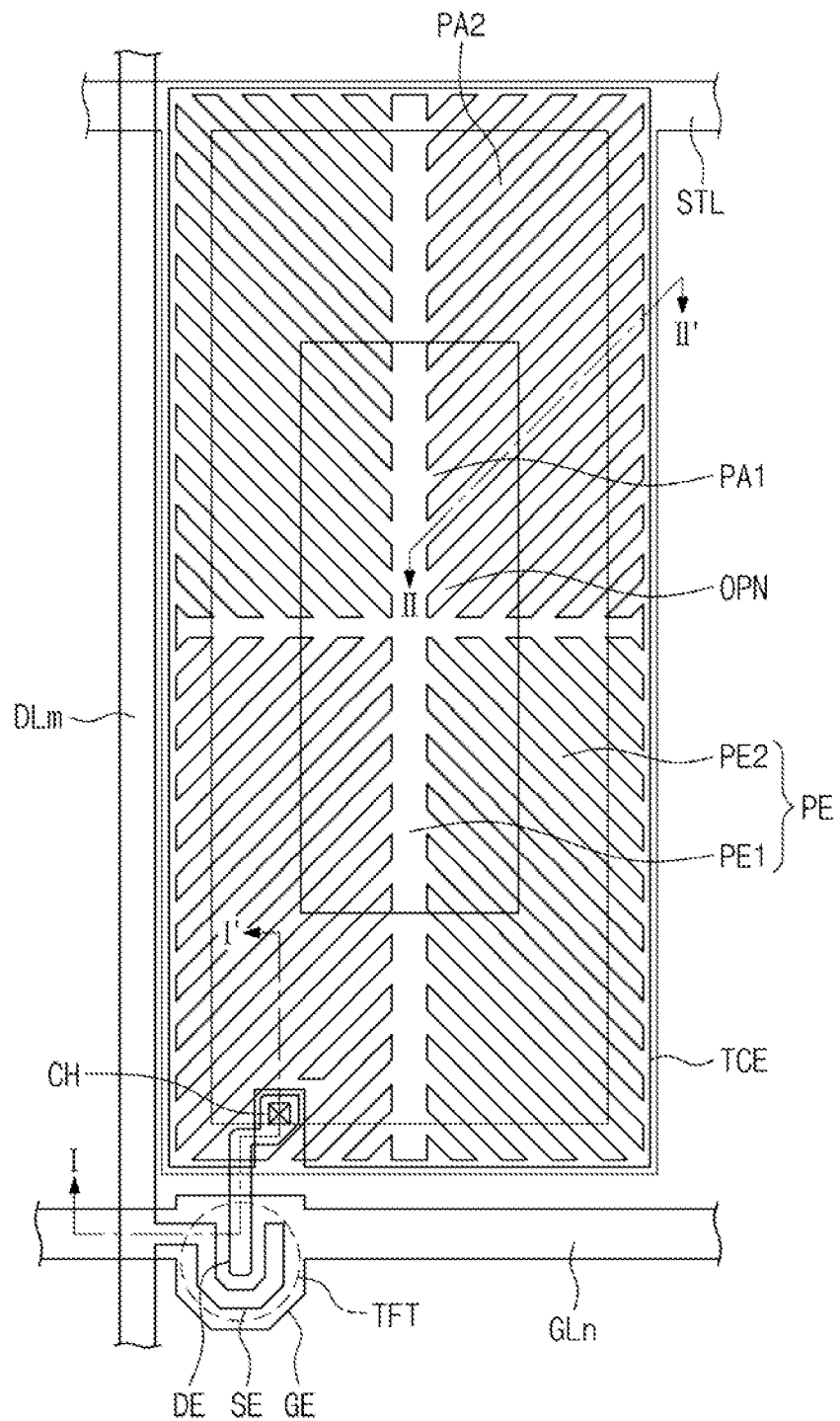
FIG. 1 is a plan view showing an LCD according to a first exemplary embodiment.

Hereinafter, exemplary embodiments will be described in detail with reference to accompanying drawings. However, the present invention is not limited to the following embodiments but includes various changes, substitutions and modifications within the technical scope of the present disclosure.

In the drawings, the sizes of layers and regions may be magnified for the purpose of clear explanation. The terms "first", "second" and the like can be used to explain various elements, but the elements are not limited to such terms. The terms are used to distinguish one element to the other element. Thus, an element referred to as a first element in one embodiment may be referred to as a second element in another embodiment. Unless the context otherwise requires, the singular expression does not exclude the plural expression.

In the following description, the terms "include" or "comprises" are used to indicate the feature, number, step, operation, elements, parts or combination thereof without excluding other features, numbers, steps, operations, elements, parts or combination thereof. It will be understood that when an element, such as a layer, a film, a region, or a plate, is referred to as being 'on' or 'under' another element, the element can be directly on another element, or an intervening element or elements may also be present therebetween. In addition, when an element is referred to as being "directly on" other element, intervening layers are not present therebetween.

Figure 2:
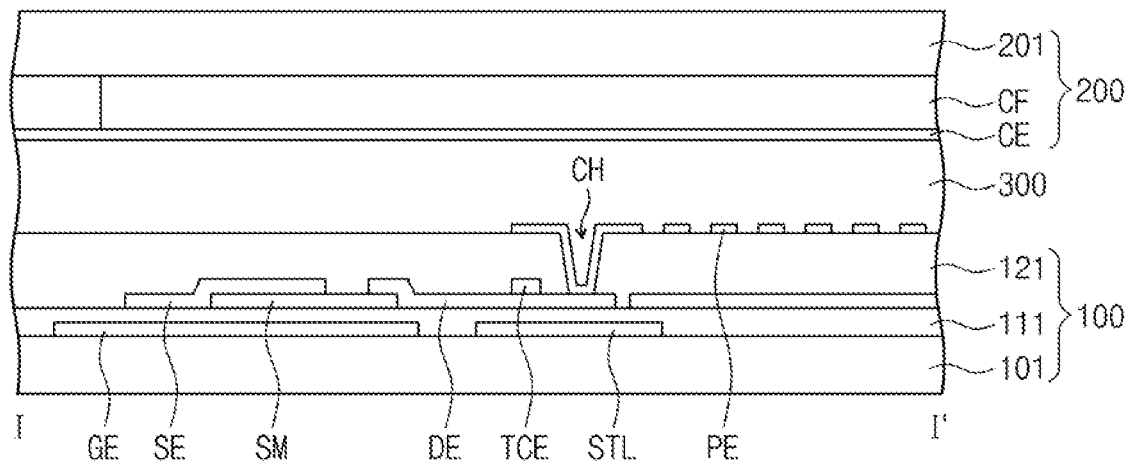
FIG. 2 is a sectional view taken along line I-I' of FIG. 1.
Figure 3A:
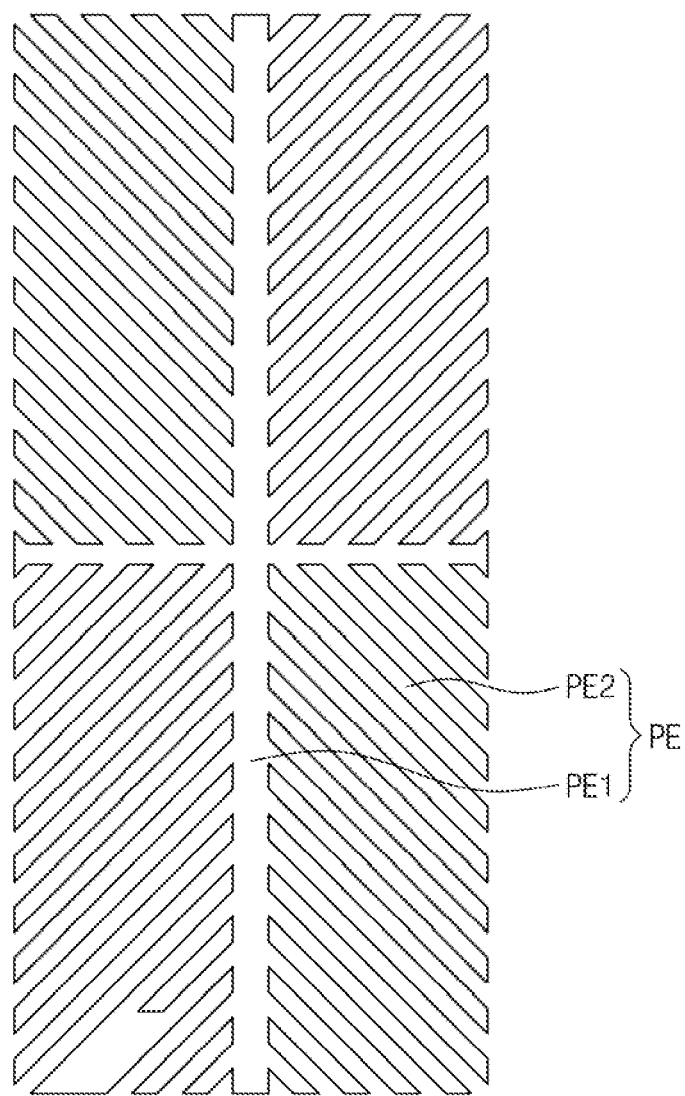
FIGS. 3A and 3B are plan views showing a pixel electrode and a texture control electrode of an LCD according to a first exemplary embodiment, respectively.
Figure 3B:
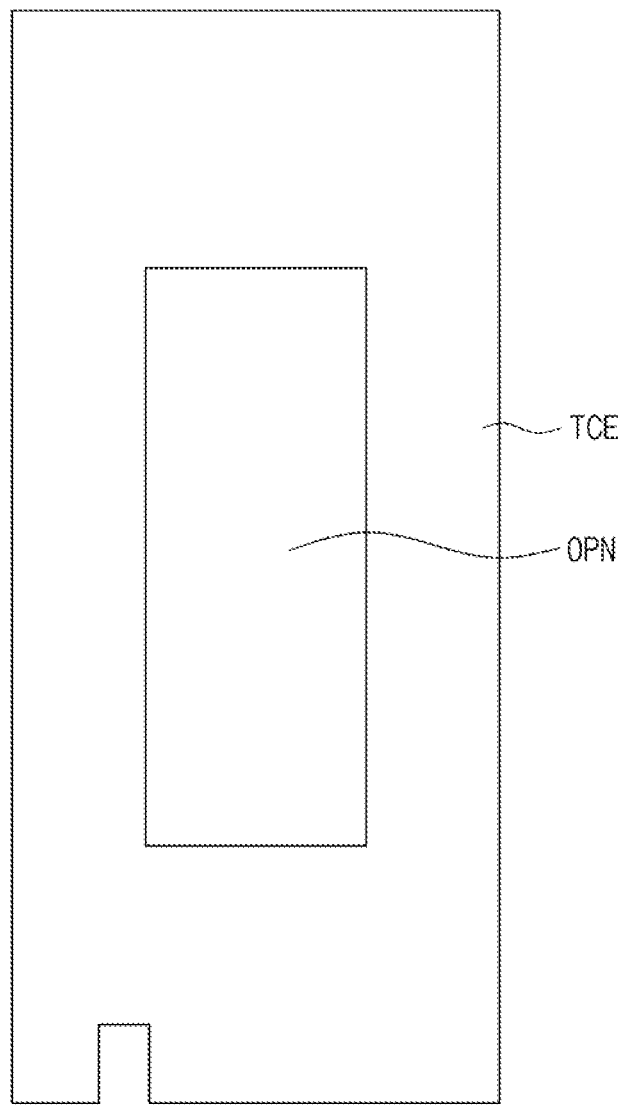
Figure 4:
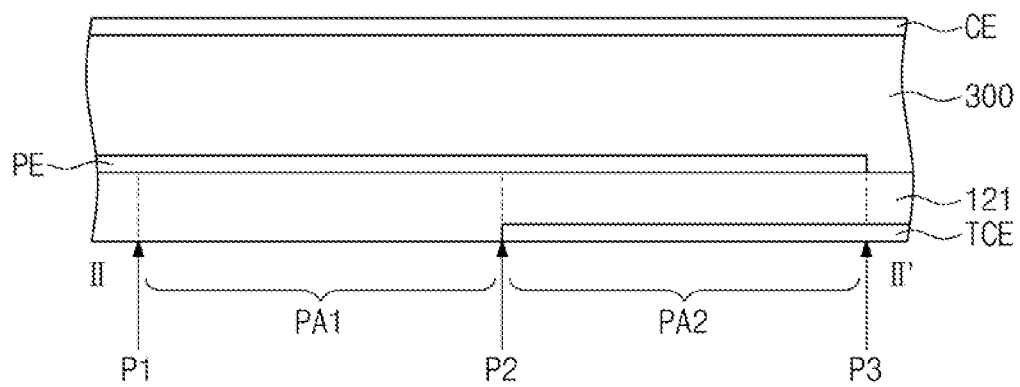
FIG. 4 is a sectional view taken along line II-II' of FIG. 1.

FIG. 1 is a plan view showing an LCD according to a first exemplary embodiment. FIG. 2 is a sectional view taken along line I-I' of FIG. 1. FIGS. 3A and 3B are plan views showing a pixel electrode and a texture control electrode of the LCD according to a first exemplary embodiment, respectively. FIG. 4 is a sectional view taken along line II-II' of FIG. 1 to illustrate a part of the LCD.

Referring to FIGS. 1 and 2, the LCD includes a first substrate 100, a second substrate 200 facing the first substrate 100, and a liquid crystal layer 300 interposed between the first and second substrates 100 and 200.

The first substrate 100 is a thin film transistor substrate having thin film transistors that are used to drive pixel electrodes that apply an electric field to liquid crystal molecules of the liquid crystal layer 300, and the second substrate 200 is a color filter substrate having color filters to represent colors of images. The liquid crystal layer 300 includes a plurality of liquid crystal molecules having dielectric anisotropy. The liquid crystal molecules are vertical alignment liquid crystal molecules, which are vertically aligned between the first and second substrates 100 and 200 (i.e., the long axes of the liquid crystal molecules are aligned perpendicular to the surfaces of the first and second substrates 100 and 200). As an electric field is applied between the first and second substrates 100 and 200, the liquid crystal molecules are rotated in a specific direction between the first and second substrates 100 and 200 to transmit or block the light. The term "rotate" used in this specification means that the liquid crystal molecules change orientation to lie in a direction that is horizontal (i.e. parallel) with respect to the surfaces of the first substrate 100 or the second substrate 200. In addition, the term "rotate" may include a general change in the direction of alignment of liquid crystal molecules as well as the specific rotation of the liquid crystal molecules to a horizontal direction.

In the following description, a normally black mode LCD, in which the liquid crystal layer 300 is black (i.e., no transmittance of light) when the electric field is not applied and is white (i.e., allows transmittance of light) when the electric field is applied, will be described as an example. In other embodiments, however, the LCD may be a normally white mode LCD.

The first substrate 100 includes a first insulating substrate 101 formed with a plurality of pixels. The first insulating substrate 101 includes (n+p) gate lines $GL_1, \ldots, GL_n, GL_{n+1}, \ldots, GL_{(n+p)-1}$, and $GL_{n+p}$, and (m+q) data lines $DL_1, \ldots, DL_m, DL_{m+1}, \ldots, DL_{(m+q)-1}$, and $DL_{m+q}$, in which each pixel may include one of the gate lines $GL_1, \ldots, GL_n, GL_{n+1}, \ldots, GL_{(n+p)-1}$, and $GL_{n+p}$ and one of the data lines $DL_1, \ldots, DL_m, DL_{m+1}, \ldots, DL_{(m+q)-1}$, and $DL_{m+q}$. For the purpose of convenience, the pixel shown in FIG. 1 includes an $n^{th}$ gate line $GL_n$ and an $m^{th}$ data line $DL_m$. Each of the pixels has the same structure.

Each pixel includes the $n^{th}$ gate line $GL_n$, a storage line STL, an insulating layer 111, the $m^{th}$ data line $DL_m$, a thin film transistor TFT, a texture control electrode TCE, a passivation layer 121 and a pixel electrode PE. The thin film transistor TFT includes a gate electrode GE, a semiconductor layer SM, a source electrode SE, and a drain electrode DE.

The $n^{th}$ gate line $GL_n$ extends in one direction on the first insulating substrate 101.

The gate electrode GE protrudes from the $n^{th}$ gate line $GL_n$ or is formed on a part of the $n^{th}$ gate line $GL_n$.

The storage line STL is disposed between the $n^{th}$ gate line $GL_n$ and the $(n+1)^{th}$ gate line $GL_{n+1}$, and is spaced apart from the $n^{th}$ gate line $GL_n$ and the $(n+1)^{th}$ gate line $GL_{n+}$. The storage line STL may surround the pixel.

The insulating layer 111 is formed over the entire surface of the first insulating substrate 101 formed with the $n^{th}$ gate line $GL_n$ and the storage line STL.

The semiconductor layer SM is formed on the insulating layer 111.

The $m^{th}$ data line $DL_m$, the source electrode SE, and the drain electrode DE are formed on the first insulating substrate 101 having the $n^{th}$ gate line $GL_n$ with the insulating layer 101 interposed therebetween.

The $m^{th}$ data line $DL_m$ extends in a direction that is different from (and may be substantially perpendicular to) the direction the $n^{th}$ gate line $GL_n$ extends, and crosses the $n^{th}$ gate line $GL_n$. The source electrode SE branches off from the $m^{th}$ data line $DL_m$ in such a manner that the source electrode SE may partially overlap the $n^{th}$ gate line $GL_n$. The drain electrode DE is spaced apart from the source electrode SE with the semiconductor layer SM interposed therebetween. The drain electrode DE may partially overlap the gate electrode GE.

The texture control electrode TCE is formed on the insulating layer 111. The texture control electrode TCE directly contacts the drain electrode DE while partially overlapping the drain electrode DE.

The passivation layer 121 is formed on the first insulating substrate 101 having the texture control electrode TCE. The passivation layer 121 has a contact hole CH through which the drain electrode DE is partially exposed.

The pixel electrode PE is formed on the texture control electrode TCE with the passivation layer 121 interposed therebetween in such a manner that the pixel electrode PE may partially overlap the texture control electrode TCE. The pixel electrode PE is connected to the drain electrode DE through the contact hole CH formed in the passivation layer 121.

The texture control electrode TCE, the pixel electrode PE and the passivation layer 121 will be further described below.

In the LCD having the above structure, the thin film transistor TFT is turned on when the gate signal is applied to the $n^{th}$ gate line $GL_n$. Thus, the data signal applied to the $m^{th}$ data line $DL_m$ is transferred to the texture control electrode TCE and the pixel electrode PE through the thin film transistor TFT.

Referring to FIGS. 1 to 4, the pixel electrode PE includes a stem part PE1 and branch parts PE2 that branch off radially from the stem part PE1. The pixel electrode PE is connected to the drain electrode DE through the contact hole CH.

Referring to FIG. 4, the pixel electrode PE and the texture control electrode TCE are divided into a first region PA1 and a second region PA2 according to the size of the overlap between the pixel electrode PE and texture control electrode TCE, when viewed in a plan view. The pixel electrode PE is provided in the first and second regions PA1 and PA2 and the texture control electrode TCE is provided in the second region PA2. That is, the first region PA1 is an area where only the pixel electrode PE is provided, and the second region PA2 is an area where the pixel electrode PE and the texture control electrode TCE are overlapped with each other. A position where the stem part PE1 (FIG. 1) of the pixel electrode PE meets the branch parts PE2 is indicated as a first position P1 (FIG. 4), a boundary between the first and second regions PA1 and PA2 is indicated as a second position P2, and a terminal end of the branch parts PE2 is indicated as a third position P3.

According to a first exemplary embodiment, the stem part PE1 has a cross shape (FIG. 3A). In this case, the pixel is divided into a plurality of regions by the stem part PE1. The branch parts PE2 are spaced apart from each other such that adjacent branch parts PE2 do not make contact with each other. In addition, the branch parts PE2 extend in parallel to each other in the region defined by the stem part PE1. Adjacent branch parts PE2 are spaced apart from each other by a distance of about 2-10 micrometers in order to pre-tilt liquid crystal molecules of the liquid crystal layer 300.

When viewed in a plan view (FIG. 3B), the texture control electrode TCE partially overlaps with the pixel electrode PE in the second region PA2. In particular, the texture control electrode TCE partially overlaps with the branch parts PE2.

The texture control electrode TCE has an opening OPN in the first region PA1 (FIG. 4) to expose a part of the insulating layer 111. According to a first exemplary embodiment, the opening OPN has a shape that is symmetrical to the stem part PE1 and, in particular, has a rectangular shape. In this case, the long lateral sides and the short lateral sides of the rectangular opening OPN are substantially parallel to, respectively, the $m^{th}$ data line $DL_m$ and $n^{th}$ gate line $GL_n$. In addition, certain outer edges of the texture control electrode TCE are substantially parallel to the lengthwise direction of the stem part PE1.

Referring to FIGS. 1, 3A and 3B, when the texture control electrode TCE overlaps with the pixel electrode PE, the texture control electrode TCE partially overlaps with the branch parts PE2 of the pixel electrode PE and has edges crossing the lengthwise direction of the second branch part PE2. When viewed in a plan view, an inside edge of the texture control electrode TCE located adjacent to the opening OPN is positioned between the stem part PE1 of the pixel electrode PE and the terminal ends of the branch parts PE2. The terminal ends of the branch parts PE2 are located within the texture control electrode TCE. The terminal ends of the branch parts PE2 are spaced apart from the outside edge of the texture control electrode TCE by a distance of about 3 μm or more, taking into consideration misalignment which may be introduced in the manufacturing process.

The second substrate 200 (FIG. 2) includes a second insulating substrate 201 provided thereon with a color filter CF and a common electrode CE.

The color filter CF is formed on the second insulating substrate 201 to provide color to the light that passes through the liquid crystal layer 300. The common electrode CE is formed on the color filter CF to drive the liquid crystal layer 300 by generating the electric field together with the pixel electrode PE and the texture control electrode TCE.

According to a first exemplary embodiment, the pixel electrode PE is spaced apart from the texture control electrode TCE with the passivation layer 121 interposed therebetween, so the effective voltage applied to the liquid crystal layer 300 from the pixel electrode PE and the texture control electrode TCE may vary even if the same voltage is applied to the pixel electrode PE and the texture control electrode TCE.

Because a dielectric layer is not formed between the pixel electrode PE and the liquid crystal layer 300, the first voltage $V_p$ applied to the pixel electrode PE is identical to the first effective voltage $V_1$ that is applied to the liquid crystal layer by the pixel electrode PE.

The effective voltage applied to the liquid crystal layer 300 when a second voltage $V_t$ is applied to the texture control electrode TCE is a second effective voltage $V_2$, which is defined in equation 1.

$$V_2 = V_t \left( 1 + \frac{d_p / d_{LC}}{\varepsilon_p / \varepsilon_{LC}} \right)^{-1}, \qquad \text{Equation 1}$$

In Equation 1, $d_{LC}$ is a thickness of the liquid crystal layer 300, $\varepsilon_p$ is a dielectric constant of the passivation layer 121, $d_p$ is a thickness of the passivation layer 121, and $\varepsilon_{LC}$ is a dielectric constant of the liquid crystal layer 300.

Because the texture control electrode TCE and the pixel electrode PE are electrically connected to the drain electrode DE, the same voltage level is applied to each. When the same voltage level is applied to both the texture control electrode TCE and the pixel electrode PE, the following is satisfied: $V_p = V_t$. Thus, actually, the second effective voltage $V_2$ is lower than the first effective voltage $V_1$.

Figure 5:
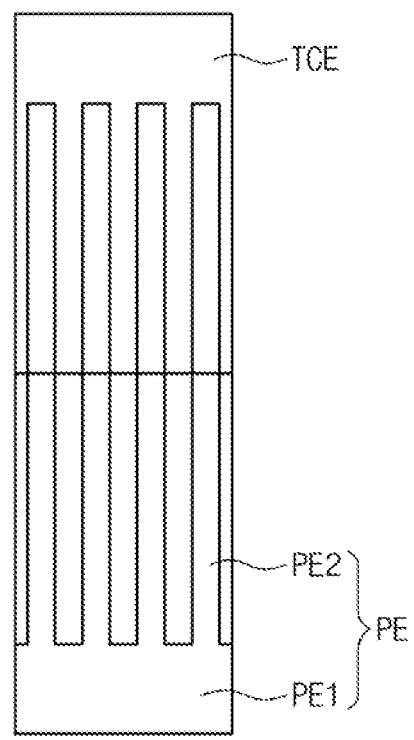
FIG. 5 is a view showing a structure of a pixel electrode and a texture control electrode for a computer simulation model according to a first exemplary embodiment.

FIG. 5 is a view showing a structure of the pixel electrode PE and the texture control electrode TCE for a computer simulation model which was used to calculate in the simulation the difference between the first and second $V_1$ and $V_2$ when voltages having the same level are applied to the texture control electrode TCE and the pixel electrode PE, respectively.

Referring to FIG. 5, the structure includes the pixel electrode PE having the stem part PE1 and a plurality of branch parts PE2 branching perpendicularly to the stem part PE1, and the texture control electrode TCE partially overlaps the branch parts PE2 at the terminal ends of the branch parts PE2. The passivation layer 121 is provided between the pixel electrode PE and the texture control electrode TCE. The passivation layer 121 is formed by inorganic insulating layers SiNx or organic insulating layers having various thicknesses.

Figure 6:
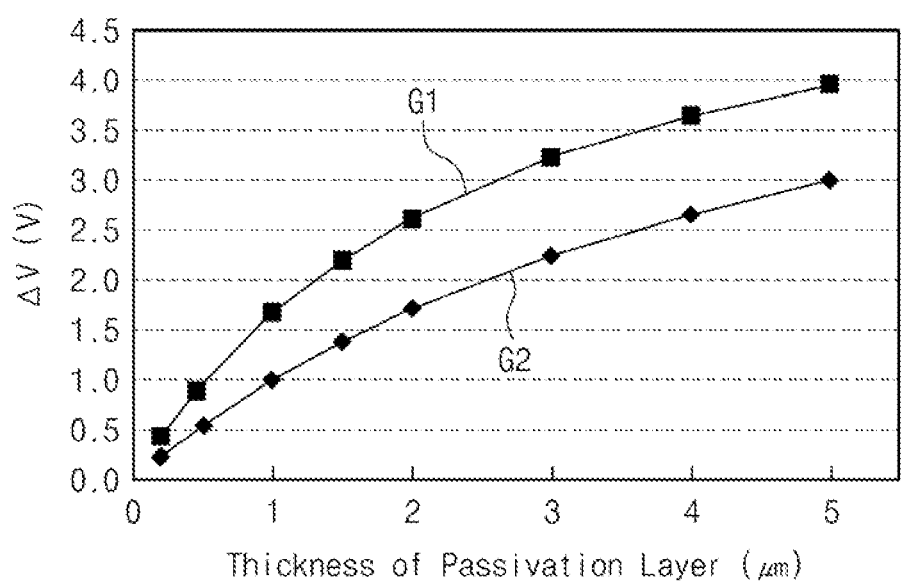
FIG. 6 is a graph showing the difference between a first effective voltage and a second effective voltage depending on the thickness of a passivation layer in an LCD having the structure of FIG. 5.

FIG. 6 is a graph showing the difference ($V_1-V_2$) between the first effective voltage $V_1$ and the second effective voltage $V_2$ as a function of the thickness of the passivation layer 121 when the same voltages are applied to the pixel electrode PE and the texture control electrode TCE by using the structure of FIG. 5. The difference ($V_1-V_2$) is represented as $\Delta V$.

Referring to FIG. 6, $\Delta V$ increases as the thickness of the passivation layer 121 becomes thicker. A greater $\Delta V$ occurs when the passivation layer 121 includes the inorganic layer G2 versus when the passivation layer 121 includes the organic layer G1. A SiNx layer is used as the inorganic layer G2.

As described above, although the same voltage is applied to the pixel electrode PE and the texture control electrode TCE, the effective voltage applied to the liquid crystal layer 300 can be adjusted by adjusting the thickness of the passivation layer 121. If the effective voltage applied to the pixel electrode PE is different from the effective voltage applied to the texture control electrode TCE, the vertical electric field formed at the edges of the pixel electrode PE and the texture control electrode TCE is initially distorted. Thus, the liquid crystal molecules located along the edges of the pixel electrode PE and the texture control electrode TCE are rotated toward the stem part PE1 of the pixel electrode PE in response to the change, or distortion, of the electric field. Then, as time elapses, the liquid crystal molecules adjacent to the rotated liquid crystal molecules are sequentially rotated, so that all liquid crystal molecules provided in the pixel region are rotated. In the LCD, the transmittance may be increased depending on the rotation of the liquid crystal molecules.

FIGS. 7A and 7B are graphs showing the transmittance obtained from a section II-II' of the LCD shown in FIG. 1 when time after the voltage has been applied to both the pixel electrode PE and the texture control electrode TCE has elapsed by 10 ms and 50 ms, respectively.

Referring to FIGS. 4 and 7A, when time after the voltage has been applied to both the pixel electrode PE and the texture control electrode TCE has elapsed by 10 ms, the transmittance at the first and third positions P1 and P3 corresponding to the edge of the pixel electrode PE and the transmittance at the second position P2 corresponding to the edge adjacent to the opening OPN of the texture control electrode TCE are higher than the transmittance of other regions. The higher transmittance for the liquid crystal layer 300 indicates that the electric field of the liquid crystal layer 300 is initially changed at the edge of the pixel electrode PE and the edge adjacent to the opening OPN of the texture control electrode TCE. In detail, the liquid crystal molecules located at the edge of the pixel electrode PE and the edge adjacent to the opening OPN of the texture control electrode TCE are primarily rotated, i.e. directly rotated by the distortion in the electric field at that location.

Referring to FIG. 7B, when time after the voltage has been applied to the pixel electrode PE and the texture control electrode TCE has elapsed by 50 ms, the higher transmittance occurs over the entire area of the pixel, which indicates that most liquid crystal molecules over the pixel electrode PE have been rotated.

As shown in FIGS. 7A and 7B, the above structure causes electric field distortion so that a primary rotation of the liquid crystal molecules occurs between the stem part PE1 and the branch parts PE2 of the pixel electrode PE when the voltage is applied to the pixel electrode PE and the texture control electrode TCE. Thus, the above structure may facilitate the secondary rotation of the liquid crystal molecules in all regions where the pixel electrode PE is formed, where "secondary rotation" refers to the rotation of liquid crystal molecules as a result of rotation of neighboring liquid crystal molecules, which may be the liquid crystal molecules primarily rotated by distortion of the electric field in particular locations.

Figure 8A:
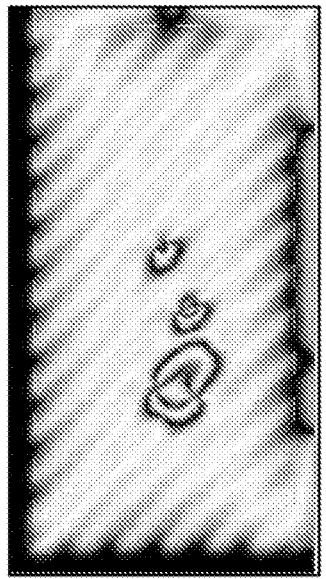
FIGS. 8A and 8B are photographs showing transmittance in a conventional LCD and an LCD according to a first exemplary embodiment, respectively.
Figure 8B:
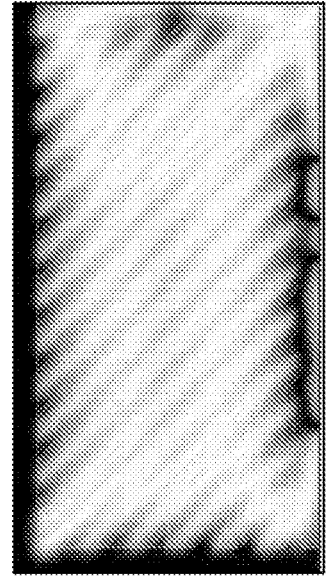

FIGS. 8A and 8B are photographs showing the transmittance from a conventional LCD and the LCD according to a first exemplary embodiment, respectively, which are obtained from a part of the pixel. The conventional LCD has the structure identical to the structure of the LCD according to the first exemplary embodiment except that the conventional LCD has no texture control electrode TCE. The conventional LCD is manufactured and driven under the same conditions of the LCD according to the first exemplary embodiment.

Referring to FIG. 8A, the texture defect occurs between the stem part and terminal ends of the branch parts of the pixel electrode in the conventional LCD. That is, when the electric field is applied to the liquid crystal layer of the conventional LCD, a non-transmittive region is formed at the liquid crystal layer located over the region between the stem part and terminal ends of the branch parts of the pixel electrode due to the misalignment of the liquid crystal molecules. The non-transmittive region, which causes the texture defect, is irregularly formed between the stem part and terminal ends of the branch parts of the pixel electrode regardless of the shape of the pixel electrode.

The texture defect is generated because the liquid crystal molecules aligned at the middle portion of each branch part may not be rotated or fully rotated by the electric field. If the branch parts have long lengths, the liquid crystal molecules aligned in a middle portion of the branch parts of pixel electrode PE, between the stem part and terminal ends of the branch parts, may not uniformly rotate when the electric field is applied thereto, or the liquid crystal molecules may rotate even though the electric field is not applied thereto. In addition, because the liquid crystal molecules in such middle portions of the branch parts are located away from both the stem part and the terminal ends of the branch parts, where the liquid crystal molecules are primarily rotated due to the electric field distortion, the liquid crystal molecules may not be rotated. If one liquid crystal molecule is not rotated, the liquid crystal molecules adjacent to the one liquid crystal molecule are subject to not being rotated. As a result, the texture defect may be increased.

Referring to FIG. 8B, different from the conventional LCD, the LCD according to a first exemplary embodiment shows uniform transmittance over the whole area of the pixel without any texture defects. In other words, the texture control electrode of the LCD according to the first exemplary embodiment can create uniform rotation of the liquid crystal molecules aligned in the middle portion of the pixel electrode PE between the stem part and the branch parts of the pixel electrode.

To prevent the texture defect as shown in FIG. 8B from occurring, the first effective voltage $V_1$ must be different from the second effective voltage $V_2$. In this regard, a ratio $(V_2/V_1)$ of the second effective voltage $V_2$ to the first effective voltage $V_1$ is set to $0.3 < V_2/V_1 < 0.9$. If the ratio is less than 0.3, the electric field may rarely be changed in the region between the stem part PE1 and the terminal ends of the branch parts PE2, so that a texture defect may occur. In addition, if the ratio is higher than 0.9, the degree of rotation of the liquid crystal molecules aligned by the pixel electrode PE alone may be different from the degree of rotation of the liquid crystal molecules aligned by the texture control electrode with the pixel electrode PE, so the transmittance may be lowered in the specific region. Thus, a ratio of $0.3 < V_2/V_1 < 0.9$ is used to achieve uniform transmittance over the whole area of the pixel.

Figure 9A:
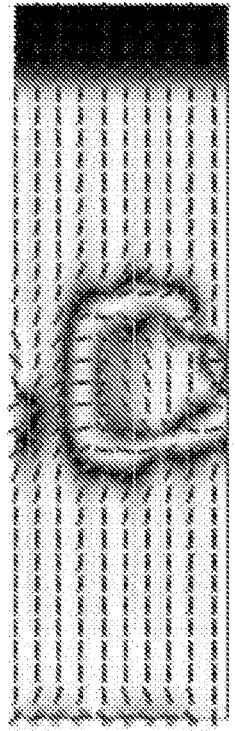
FIGS. 9A to 9E are photographs showing the results of simulations of the alignment and transmittance of liquid crystal molecules when the differential value between the first and second effective voltages is changed in a conventional LCD and an LCD according to a first exemplary embodiment.

FIGS. 9A to 9E are photographs showing results of simulations of the alignment and transmittance of the liquid crystal molecules when the differential value between the first and second effective voltages $V_1$ and $V_2$ is changed in the conventional LCD and the LCD according to a first exemplary embodiment. FIG. 9A shows the alignment and transmittance of the liquid crystal molecules when 6V is applied to the pixel electrode of the conventional LCD. FIGS. 9B to 9E show the alignment and transmittance of the liquid crystal molecules when the first effective voltage is 6V, and the differential value $\Delta V$ between the first and second effective voltages $V_1$ and $V_2$ is 0.8V, 0.9V, 1.1V and 2.0V, respectively. The results shown in FIGS. 9A to 9E are obtained by using the structure for pixel electrode PE and the texture control electrode TCE shown in FIG. 5.

Figure 9B:
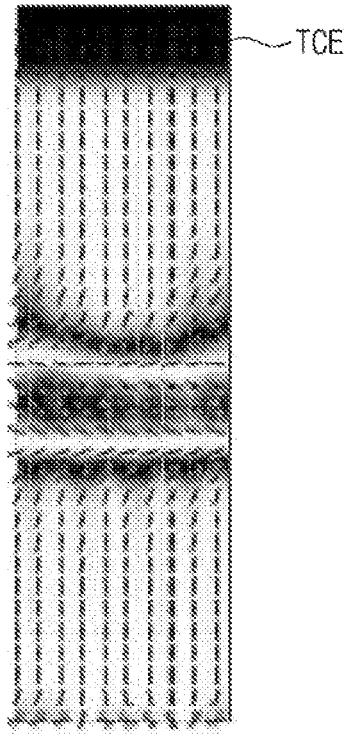
Figure 9C:
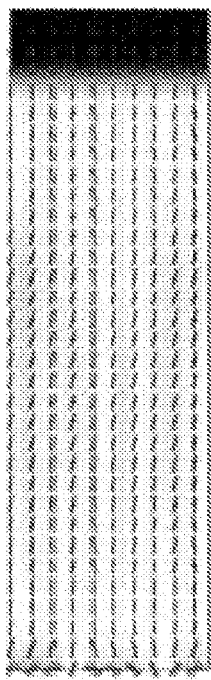
Figure 9D:
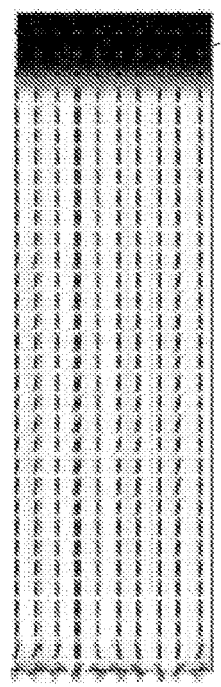
Figure 9E:

Referring to FIG. 9A, the texture defect occurs in the conventional LCD, which does not have a texture control electrode TCE. Referring to FIG. 9B, when the differential value $\Delta V$ is 0.8V, that is, when the first effective voltage is 6V and the second effective voltage is 5.2V, the texture defect occurs by the texture control electrode TCE even though there is a difference between first and second effective voltages. Referring to FIGS. 9C to 9E, the texture defect is not generated when the differential value $\Delta V$ is 0.9V, 1.1V and 2.0V.

Figure 10:
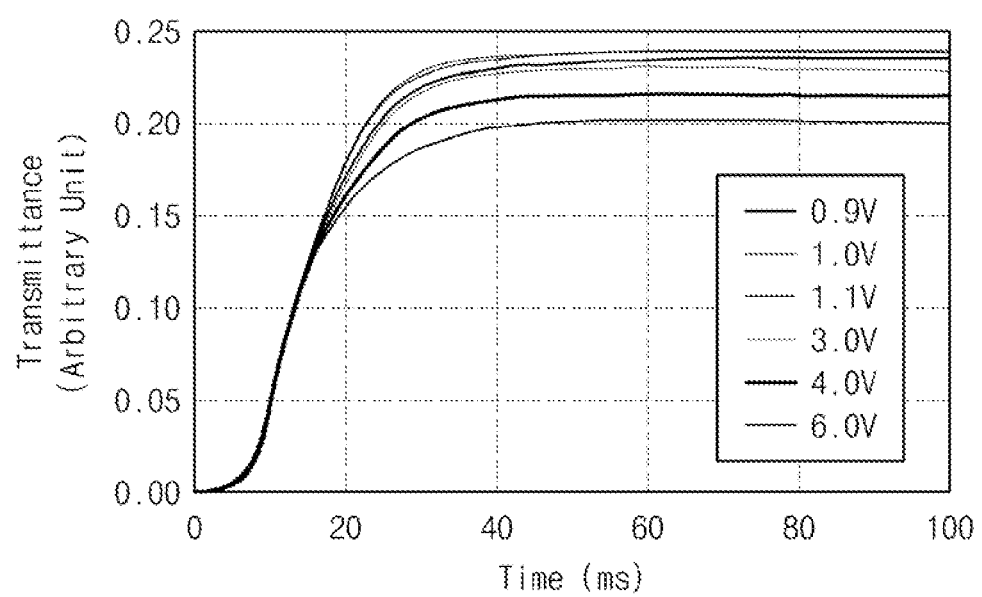
FIG. 10 is a graph showing transmittance when the differential value between the first and second effective voltages is changed.

FIG. 10 is a graph showing the transmittance when the differential value $\Delta V$ between the first and second effective voltages $V_1$ and $V_2$ is changed. The results shown in FIG. 10 were obtained by using the structure for pixel electrode PE and the texture control electrode TCE shown in FIG. 5.

Referring to FIG. 10, the transmittance suitable for the LCD is obtained when the differential value $\Delta V$ is in the range of about 0.9V to about 6.0V. In particular, the highest transmittance is obtained when the differential value $\Delta V$ is 1.1V. If the differential value $\Delta V$ is less than 4.0V, the transmittance is about 80% to about 85% based on the maximum transmittance, so the display quality may be degraded.

The first and second effective voltages $V_1$ and $V_2$ may vary depending on the structure of the first substrate 100 or the voltage applied to the pixel electrode PE. When taking the simulation results of FIGS. 9A to 9E and 10 into consideration, texture defects may not occur and the desired transmittance can be maintained when the first and second effective voltages $V_1$ and $V_2$ satisfy $0.3 V_1 < V_2 < 0.9 V_1$.

To obtain the desired differential value $\Delta V$ between the first and second effective voltages $V_1$ and $V_2$, the passivation layer 121 may have a thickness of between about 0.4 μm to about 5 μm. The passivation layer including the inorganic layer, such as a SiNx layer, may have a thickness in the range of about 0.9 μm to about 5 μm, and the passivation layer 121 including the organic layer may have a thickness in the range of about 0.45 μm to about 3 μm.

Figure 11:
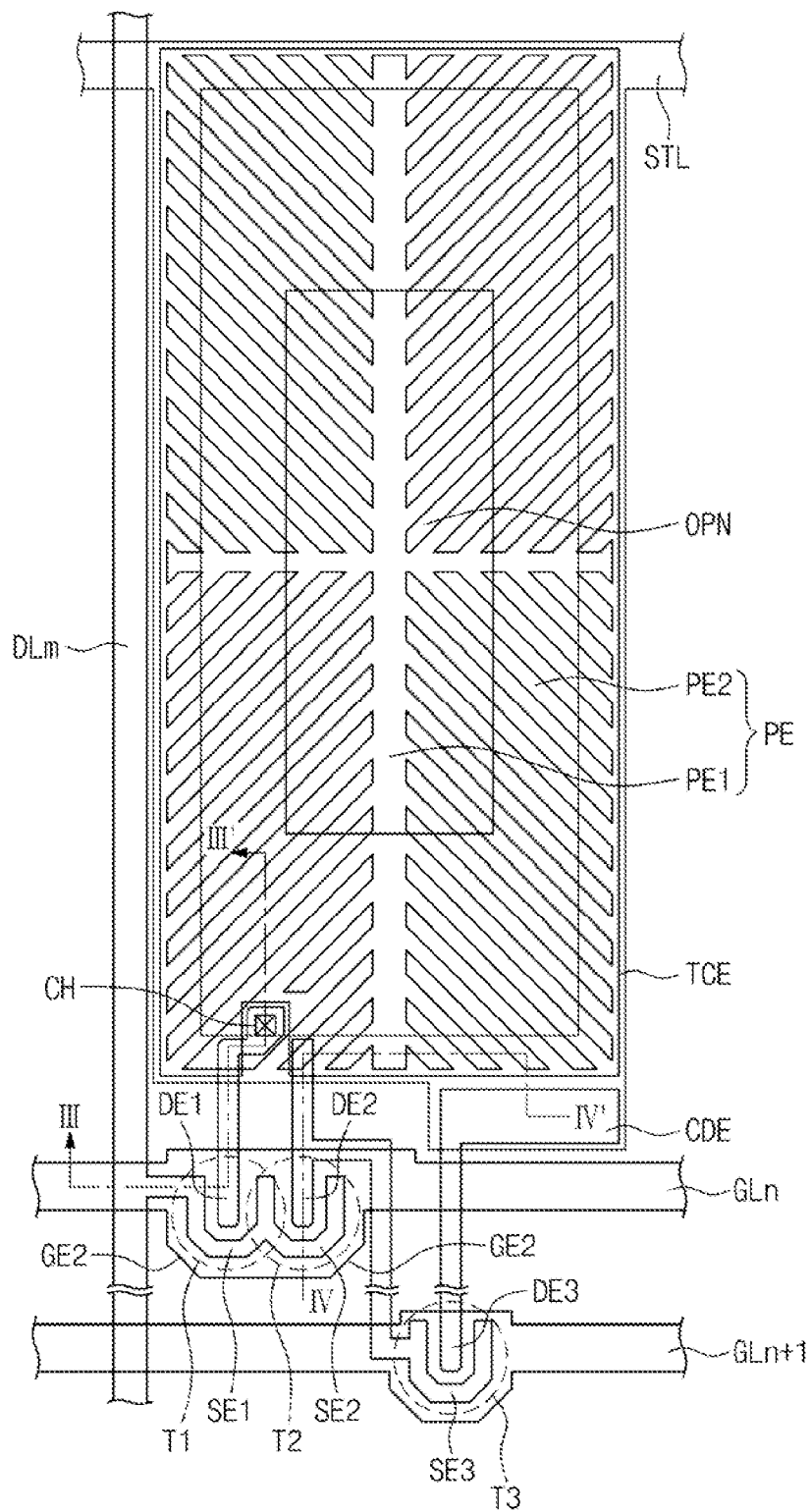
FIG. 11 is a plan view showing an LCD according to a second exemplary embodiment.
Figure 12:
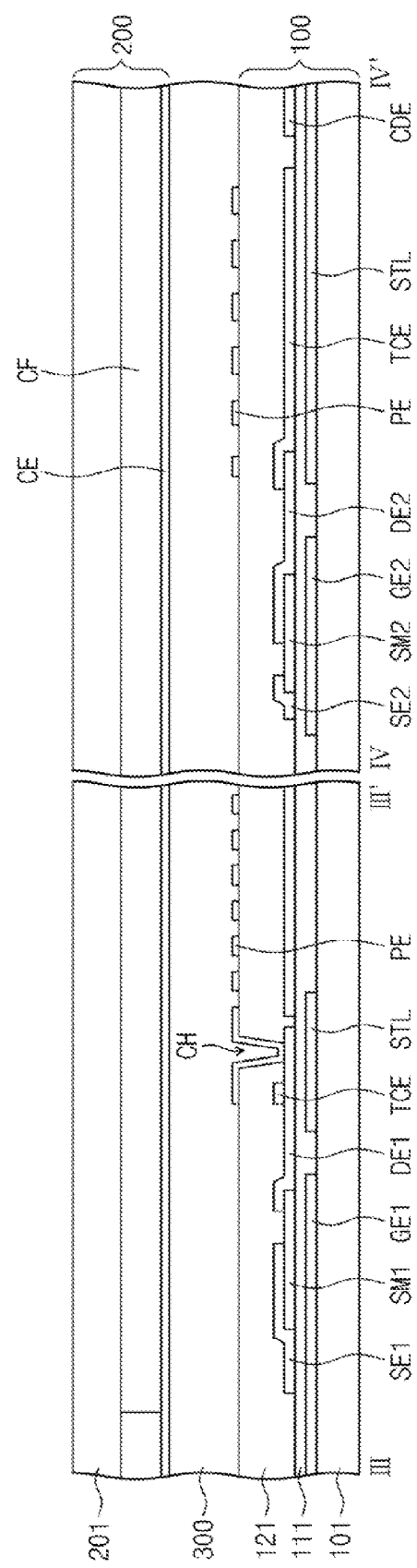
FIG. 12 is a sectional view taken along line of FIG. 11.

FIG. 11 is a plan view showing an LCD according to a second exemplary embodiment, and FIG. 12 is a sectional view taken along line III-III' of FIG. 11.

The following description of a second exemplary embodiment will be focused on the difference with respect to the first exemplary embodiment in order to avoid redundancy, and, unless otherwise expressed, the technical features of the first exemplary embodiment are adopted in the second embodiment. The same or similar reference numerals will be used to refer to the same or similar elements.

According to the first exemplary embodiment, the differential value $\Delta V$ between the first and second effective voltages $V_1$ and $V_2$ is obtained by varying the thickness of the passivation layer 121 although the voltage having the same level is applied to the pixel electrode PE and the texture control electrode TCE. However, according to a second exemplary embodiment, a charge sharing structure is employed such that the voltage level applied to the pixel electrode PE is different from the voltage level applied to the texture control electrode TCE, thereby obtaining the differential value $\Delta V$ between the first and second effective voltages $V_1$ and $V_2$.

Referring to FIGS. 11 and 12, the LCD includes a first insulating substrate 101 having pixels.

The first insulating substrate 101 includes (n+p) gate lines $GL_1, \ldots, GL_n, GL_{n+1}, \ldots, GL_{(n+p)-1}$, and $GL_{n+p}$, and (m+q) data lines $DL_1, \ldots, DL_m, DL_{m+1}, \ldots, DL_{(m+q)-1}$, and $DL_{m+q}$, in which each pixel may include one of the gate lines $GL_1, \ldots, GL_n, GL_{n+1}, \ldots, GL_{(n+p)-1}$, and $GL_{+p}$ and one of the data lines $DL_1, \ldots, DL_m, DL_{m+1}, \ldots, DL_{(m+q)-1}$, and $DL_{m+q}$. For the purpose of convenience, an $n^{th}$ gate line $GL_n$, an $(n+1)^{th}$ gate line $GL_{n+1}$ and an $m^{th}$ data line $DL_m$ are illustrated in the pixel shown in FIG. 11 and remaining drawings, and redundant parts are omitted. Each of the pixels has the same structure.

Each pixel includes the $n^{th}$ gate line $GL_n$, a storage line STL, an insulating layer 111, the $m^{th}$ data line $DL_m$, first to third thin film transistors T1, T2 and T3, a texture control electrode TCE, a passivation layer 121 and a pixel electrode PE. The first thin film transistor T1 includes a first gate electrode GE1, a first semiconductor layer SM1, a first source electrode SE1, and a first drain electrode DE1, the second thin film transistor T2 includes a second gate electrode GE2, a second semiconductor layer SM2, a second source electrode SE2, and a second drain electrode DE2, and the third thin film transistor T3 includes a third gate electrode GE3, a third semiconductor layer SM3, a third source electrode SE3, and a third drain electrode DE3.

The $n^{th}$ gate line $GL_n$, the $(n+1)^{th}$ gate line $GL_{n+1}$, the first to third gate electrodes GE1, GE2, and GE3, and the storage line STL are provided on the first insulating substrate 101.

The $n^{th}$ gate line $GL_n$ extends in one direction on the first insulating substrate 101. The $(n+1)^{th}$ gate line $GL_{n+1}$ is formed in an adjacent pixel while being spaced apart from the $n^{th}$ gate line $GL_n$ in parallel to the $n^{th}$ gate line $GL_n$.

The first and second gate electrodes GE1 and GE2 may branch off from the $n^{th}$ gate line $GL_n$. According to the present exemplary embodiment, the first and second gate electrodes GE1 and GE2 are formed as a part of the $n^{th}$ gate line $GL_n$. The third gate electrode GE3 is formed as a part of the $(n+1)^{th}$ gate line $GL_{n+1}$.

The storage line STL is disposed between the $n^{th}$ gate line $GL_n$ and the $(n+1)^{th}$ gate line $GL_{n+1}$ and is spaced apart from the $n^{th}$ gate line $GL_n$ and the $(n+1)^{th}$ gate line $GL_{n+1}$. The storage line STL may surround the pixel.

The insulating layer 111 is formed on the $n^{th}$ gate line $GL_n$ and an entire surface of the first insulating substrate 101 formed with the $n^{th}$ gate line $GL_n$ and the storage line STL.

The $m^{th}$ data line $DL_m$, the first source electrode SE1, the first drain electrode DE1, the second source electrode SE2, the second drain electrode DE2, the third source electrode SE3, the third drain electrode DE3, and the charge sharing electrode CDE are formed on the first insulating substrate 101 having the $n^{th}$ gate line $GL_n$.

The $m^{th}$ data line $DL_m$ extends in a direction that is different from (and may be substantially perpendicular to) the direction of the nth gate line $GL_n$ and crosses the $n^{th}$ gate line $GL_n$ with the insulating layer 111 interposed therebetween. The first and second source electrode SE1 and SE2 branch off from the $m^{th}$ data line $DL_m$ in such a manner that the first and second source electrodes SE1 and SE2 may partially overlap the $n^{th}$ gate line $GL_n$. The first and second source electrodes SE1 and SE2 are connected with each other.

The first and second drain electrodes DE1 and DE2 are spaced apart from the first and second source electrodes SE1 and SE2 with the first and second semiconductor layers SM1 and SM2 interposed between the first and second source electrodes SE1 and SE2 in such a manner that the first and second drain electrodes DE1 and DE2 may partially overlap the $n^{th}$ gate line $GL_n$.

The third source electrode SE3 branches off from the second electrode DE2 in such a manner that the third source electrode SE3 may partially overlap the $(n+1)^{th}$ gate line $GL_{n+1}$. The third drain electrode DE3 is spaced apart from the third source electrode SE3 with the third semiconductor layer SM3 interposed therebetween in such a manner that the third drain electrode DE3 may partially overlap the $(n+1)^{th}$ gate line $GL_{n+1}$. When viewed in a plan view, the charge sharing electrode CDE overlaps the storage line STL of the pixel.

The texture control electrode TCE is formed on the insulating layer 111. The texture control electrode TCE directly contacts the second drain electrode DE2 while partially overlapping the second drain electrode DE2.

The pixel electrode PE is formed on the first insulating substrate 101 having the first to third source electrodes SE1, SE2 and SE3 and the first to third drain electrodes DE1, DE2 and DE3, with the passivation layer 121 interposed therebetween. The pixel electrode PE is connected to the first drain electrode DE1 through the contact hole CH formed in the passivation layer 121.

Figure 13:
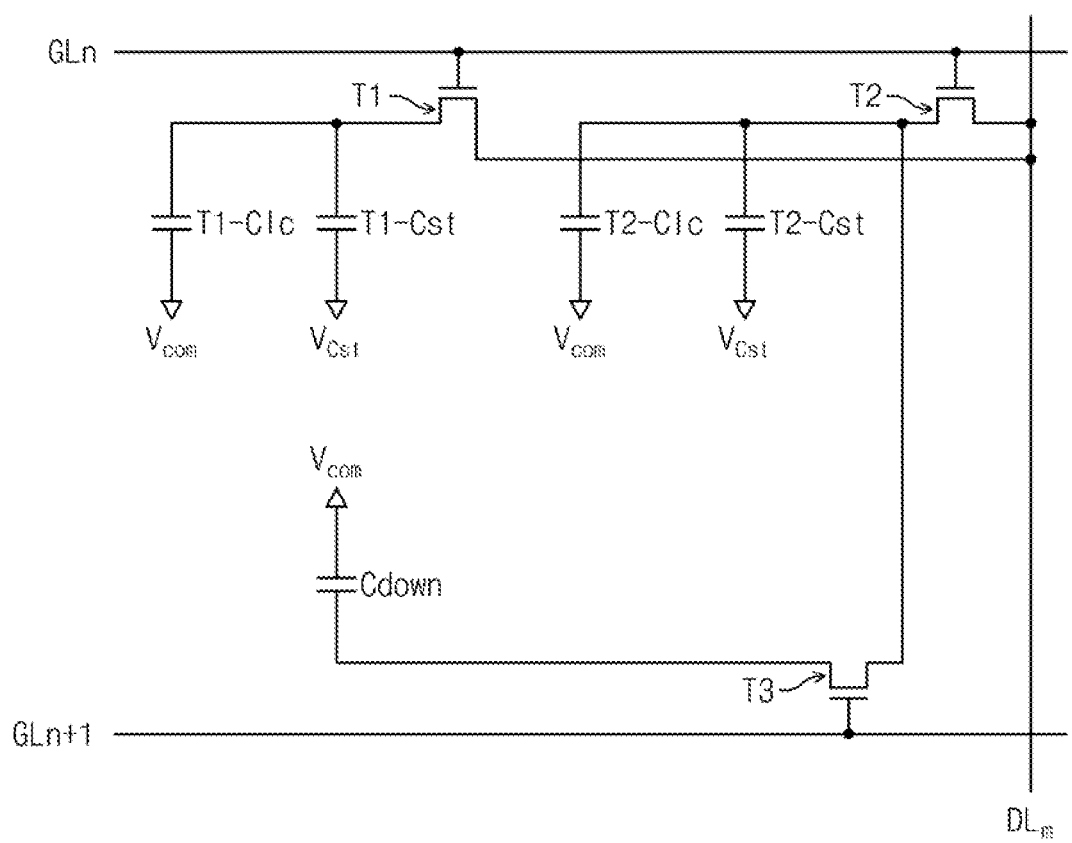
FIG. 13 is an equivalent circuit view of a pixel provided in an LCD shown in FIG. 11.

FIG. 13 is an equivalent circuit diagram of the pixel provided in the LCD shown in FIG. 11. The method of driving the LCD according to the second exemplary embodiment will be described in detail with reference to FIG. 13.

The pixel having the first and second thin film transistors T1 and T2 is formed with first and second liquid crystal capacitors T1-Clc and T2-Clc and first and second storage capacitors T1-Cst and T2-Cst.

The first thin film transistor T1 includes the first gate electrode GE1 connected to the $n^{th}$ gate line $GL_n$, the first source electrode SE1 connected to the $m^{th}$ data line $DL_m$, and the first drain electrode. DE1 connected to the first liquid crystal capacitor T1-Clc. The first liquid crystal capacitor T1-Clc is defined by the pixel electrode PE connected to the first drain electrode DE1, the common electrode CE facing the pixel electrode PE and receiving the common voltage Vcom, and the liquid crystal layer 300 interposed between the pixel electrode PE and the common electrode CE. The first storage capacitor T1-Cst is defined by the pixel electrode PE, the storage line STL to which a storage capacitor voltage Vcst is applied and the storage capacitor voltage Vcst substantially equals the common voltage Vcom, and the insulating layer 111 and the passivation layer 121, which are interposed between the pixel electrode PE and the storage line STL.

The second thin film transistor T2 includes the second gate electrode GE2 connected to the $n^{th}$ gate line $GL_n$, the second source electrode SE2 connected to the $m^{th}$ data line $DL_m$, and the second drain electrode DE2 connected to the second liquid crystal capacitor T2-Clc. The second liquid crystal capacitor T2-Clc is defined by the texture control electrode TCE connected to the second drain electrode DE2, the common electrode CE facing the texture control electrode TCE and receiving the common voltage Vcom, and the liquid crystal layer 300 interposed between the texture control electrode TCE and the common electrode CE. The second storage capacitor T2-Cst is defined by the texture control electrode TCE, the storage line STL to which the storage capacitor voltage Vcst is applied, and the insulating layer 111 and the passivation layer 121, which are interposed between the texture control electrode TCE and the storage line STL.

The gate signal is applied to the $n^{th}$ gate line $GL_n$. The data signal is applied to the $m^{th}$ data line $DL_m$. If the first and second thin film transistors T1 and T2 are turned on in response to the gate signal applied through the $n^{th}$ gate line $GL_n$, the data signal is output to both the pixel electrode PE and the texture control electrode TCE through the first and second thin film transistors T1 and T2 in synchronization with the gate signal applied to the $n^{th}$ gate line $GL_n$.

If the gate signal is applied to the $n^{th}$ gate line $GL_n$, the first and second thin film transistors T1 and T2 are turned on. Thus, the data signal applied to the $m^{th}$ data line $DL_m$ is transferred to both the pixel electrode PE and the texture control electrode TCE of the first and second liquid crystal capacitors T1-Clc and T2-Clc through the first and second thin film transistors T1 and T2. Because the same signal is applied to the pixel electrode PE and the texture control electrode TCE of the first and second liquid crystal capacitors T1-Clc and T2-Clc, the first and second liquid crystal capacitors T1-Clc and T2-Clc are charged with first and second pixel voltages having the same level, respectively.

In a voltage adjusting module of the pixel, the third thin film transistor T3 adjusts the level of first and second pixel voltages charged in the pixel electrode PE and the texture control electrode TCE, respectively. The third thin film transistor T3 includes the third gate electrode GE3 connected to the $(n+1)^{th}$ gate line $GL_{n+1}$, the third source electrode SE3 connected to the texture control electrode TCE, and the third drain electrode DE3 connected to a down capacitor Cdown.

The down capacitor Cdown is defined by the storage line STL, the charge sharing electrode CDE connected to the third drain electrode DE3 while partially overlapping the storage line STL, and the insulating layer 111 interposed between the charge sharing electrode CDE and the storage line STL.

The third thin film transistor T3 is turned on in response to the gate signal, which is applied to the $(n+1)^{th}$ gate line $GL_{n+1}$ after the gate signal has been applied to the $n^{th}$ gate line $GL_n$, and outputs the voltage control signal. Thus, the texture control electrode TCE is electrically connected to the charge sharing electrode CDE. Therefore, the level of the first pixel voltage charged in the first liquid crystal capacitor T1-Clc and the level of the second pixel voltage charged in the second liquid crystal capacitor T2-Clc are adjusted by the down capacitor Cdown. In detail, the second pixel voltage is caused to be at a lower level by the down capacitor Cdown. At this time, the lowered voltage level may vary depending on the capacitance value of the down capacitor Cdown.

In this manner, the different voltages can be applied to the pixel electrode PE and the texture control electrode TCE by using the voltage adjusting module. Therefore, according to a second exemplary embodiment, the differential value ΔV between the first and second effective voltages $V_1$ and $V_2$ can be adjusted by applying different voltages to the pixel electrode PE and the texture control electrode TCE. As a result, the texture defect may be reduced.

In addition, according to another exemplary embodiment, the first and second voltages having different levels are supplied, and also the thickness of the passivation layer 121 is adjusted, to adjust the first and second effective voltages $V_1$ and $V_2$, thereby reducing the texture defect.

Figure 14:
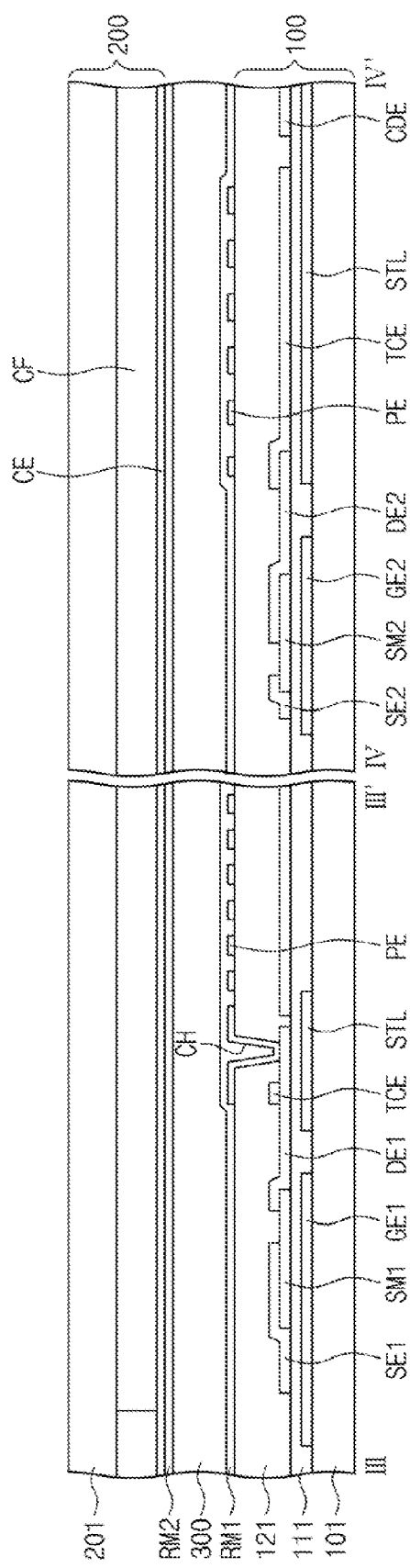
FIG. 14 is a sectional view showing an LCD according to a third exemplary embodiment.

FIG. 14 is a sectional view showing an LCD according to a third exemplary embodiment. The plan view of the LCD according to a third exemplary embodiment is substantially identical to the plan view of the LCD according to the second exemplary embodiment and the section view of FIG. 14 is taken along line III-III' of FIG. 11. The following description of a third exemplary embodiment will be focused on the difference with respect to the first exemplary embodiment to avoid redundancy, and, unless otherwise expressed, the technical features of the first exemplary embodiment will be adopted in the third exemplary embodiment. The same or similar reference numerals will be used to refer to the same or similar elements.

According to a third exemplary embodiment, reactive mesogen layers RM1 and RM2 are provided to pre-tilt the liquid crystal molecules of the liquid crystal layer. The reactive mesogen layers RM1 and RM2 include a first reactive mesogen layer RM1, which is interposed between the pixel electrode PE and the liquid crystal layer 300, and a second reactive mesogen layer RM2, which is interposed between the common electrode CE and the liquid crystal layer 300.

Reactive mesogen has properties similar to that of the liquid crystal molecules. The reactive mesogen layers RM1 and RM2 can be formed by polymerizing photo-reactive monomers that are on the pixel electrode and the common electrode. The photo-reactive monomers may be polymerized by irradiating light, such as ultraviolet rays, onto the photo-reactive monomers. The polymer extends in a specific direction to cause the liquid crystal molecules to pre-tilt, i.e., to align along a specific direction without the application of an electric field. In detail, the liquid crystal molecules of the liquid crystal layer 300 can be pre-tilted at an angle of about 85° to 95° by the reactive mesogen layers. The liquid crystal molecules of the liquid crystal layer 300, which are pre-tilted at the predetermined angle, may have a faster response speed upon application of the electric field than that of the liquid crystal molecules that are not pre-tilted. In this manner, the reactive mesogen layers RM1 and RM2 may serve be used to direct the liquid crystal layer 300.

The reactive mesogen layers RM1 and RM2 may include a compound comprised of various functional groups; For instance, the reactive mesogen layers RM1 and RM2 may include a compound represented as chemical formula 1.

$R_3$-J-K—$R_4$       [Chemical formula 1]

In chemical formula 1, J and K represent

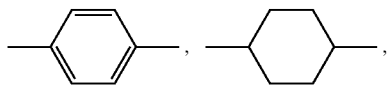

-continued

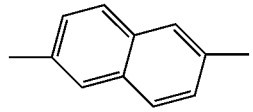

or a single bond, respectively, except that both J and K represent the single bond. Hydrogen atoms of J and K can be replaced with F, Cl, alkyl group having C1 to C12, or —OCH$_3$. In addition, R$_3$ and R$_4$ represent

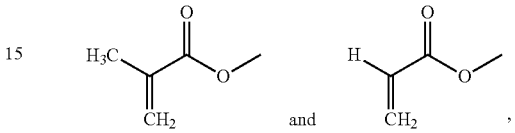

respectively or hydrogen atoms except that both R$_3$ and R$_4$ represent the single bond.

Although a third exemplary embodiment discloses the reactive mesogen layers RM1 and RM2, which are additionally formed, embodiments are not limited thereto. According to another exemplary embodiment, the reactive mesogen layers can be attached to the polymer of the alignment layer as a functional group such that the reactive mesogen layers may serve as an auxiliary layer for the alignment layer. For instance, the alignment layer may include polyimide and the reactive mesogen can be attached to the side chain of the polyimide. In this case, the pre-tilt angle of the liquid crystal molecules of liquid crystal layer 300 can be adjusted, so that the fast reaction speed can be achieved.

According to first and second exemplary embodiments, the opening OPN of the texture control electrode TCE has a rectangular shape. However, according to other exemplary embodiments, the opening OPN of the texture control electrode TCE may have various shapes other than the rectangular shape.

Figure 15A:
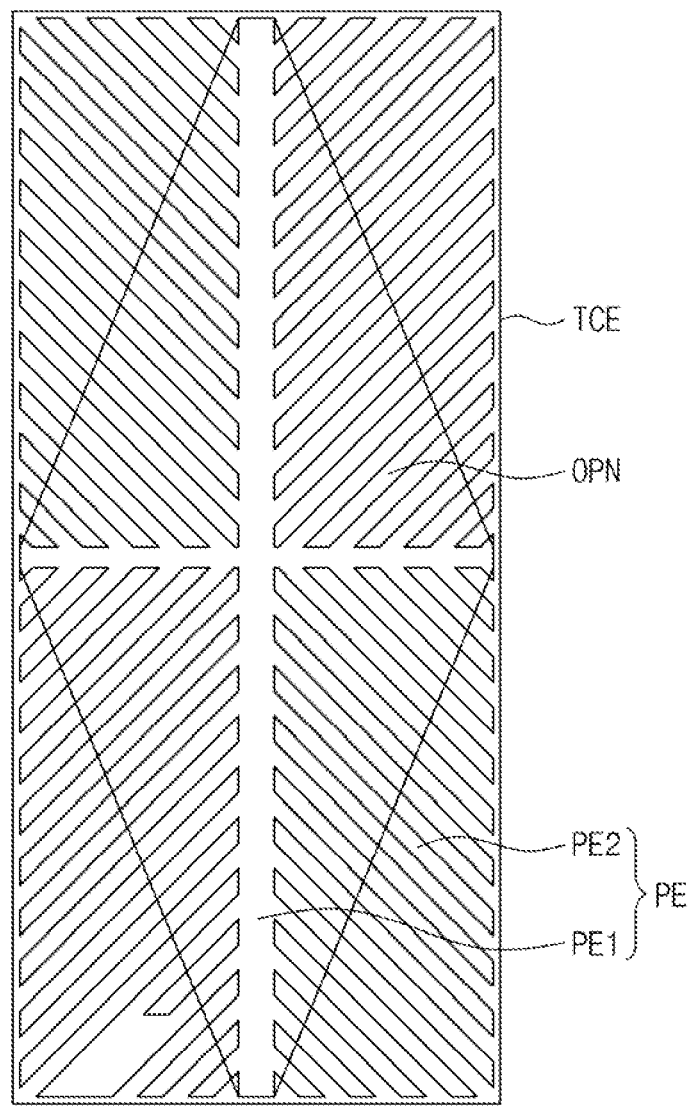
FIGS. 15A to 15C are views showing LCDs according to fourth to sixth exemplary embodiments.
Figure 15B:
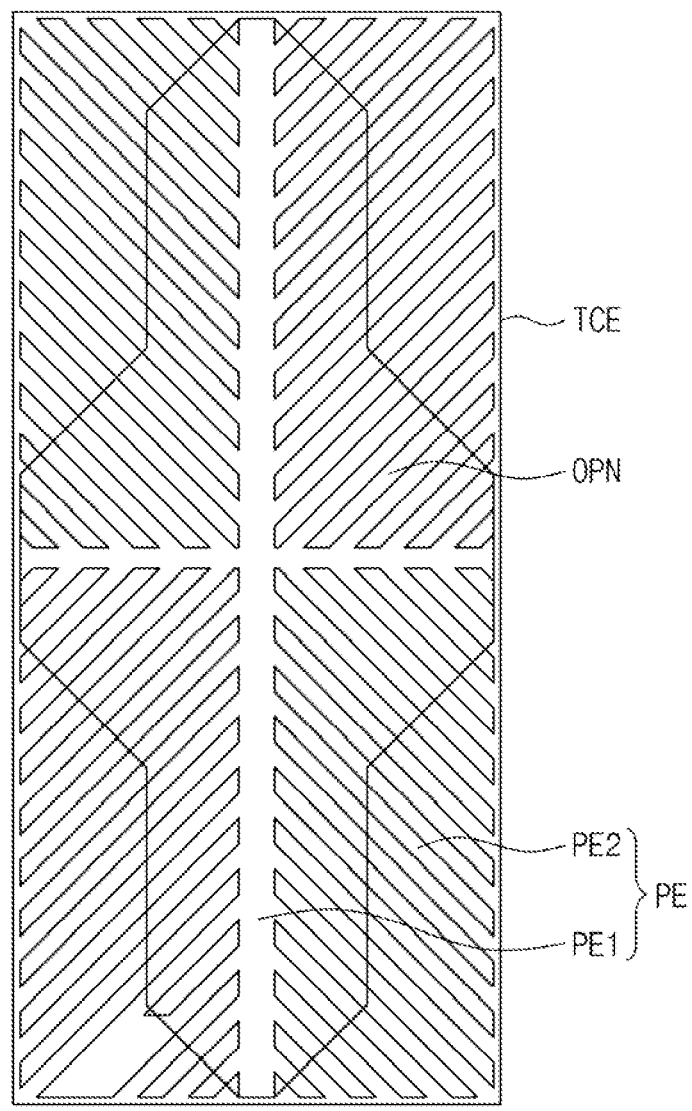
Figure 15C:
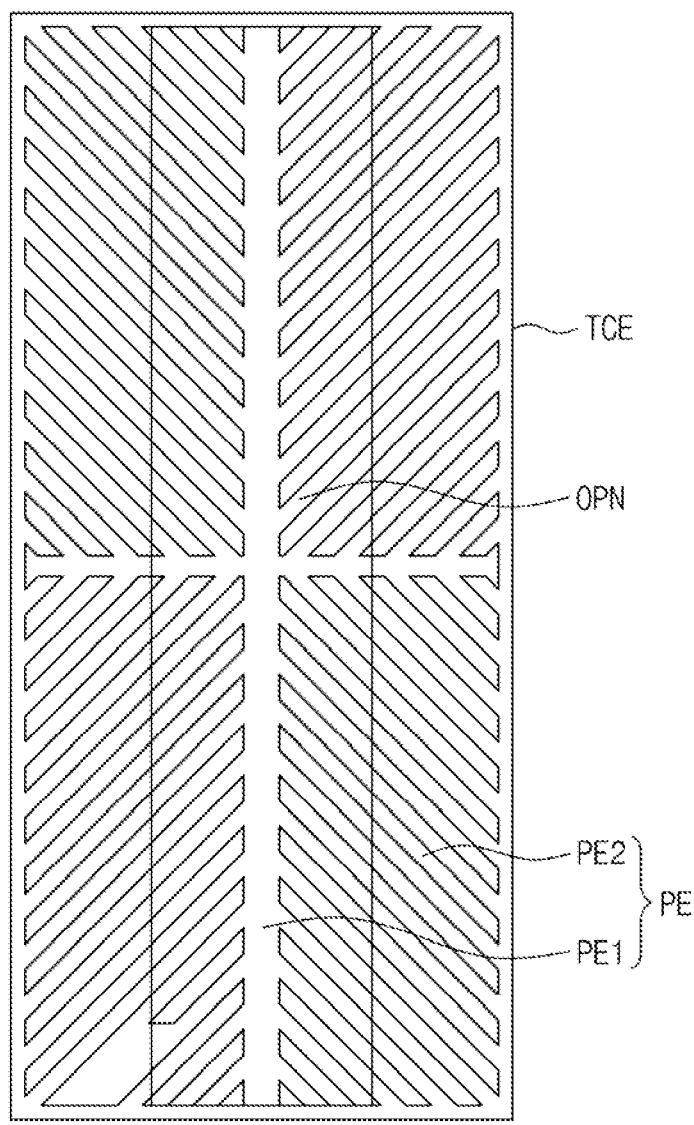

FIGS. 15A to 15C are views showing LCDs according to fourth to sixth exemplary embodiments. The fourth to sixth exemplary embodiments are substantially identical to a first exemplary embodiment except for the pixel electrode and the texture control electrode. Thus, for the purpose of convenience, only the pixel electrode PE and the texture control electrode TCE are shown in FIGS. 15A to 15C.

Referring to FIGS. 15A to 15C, the opening OPN may have various shapes. For instance, the opening OPN may have a trapezoidal shape, a polygonal shape, a rectangular shape, etc. In addition, the opening OPN can be designed such that the region exposed through opening OPN may have various areas. The edge of the texture control electrode TCE adjacent to the opening OPN may be positioned at the intermediate point along the lengthwise direction of the branch parts PE. For the branch parts PE2 that have longer lengths, the liquid crystal molecules positioned in a middle area between the stem part PE1 and the terminal ends of the branch part PE2 may not be controlled, so that the texture defect may occur. In this regard, the edge of the texture control electrode TCE adjacent to the opening OPN is located along an intermediate position, e.g. at a mid-point, of the branch parts PE for each of the branch parts PE. In addition, the width of the insulating layer 111 exposed through the opening OPN may be enlarged or reduced according to the shape of the stem part PE1 or the branch part PE2.

The opening OPN may, for example, have a shape with line symmetry a predetermined axis or with point symmetry about a point, according to the shape of the pixel. In order to ensure a wide viewing angle, the pixel electrode PE may have a shape with line symmetry or point symmetry about the predetermined axis or point, and the texture control electrode TCE has the shape corresponding to the pixel electrode PE, i.e. the texture control electrode TCE may have the shape with line symmetry or point symmetry about the predetermined axis or point. For instance, the opening OPN may have a rectangular shape line-symmetrical to a linear line, which passes through the center of the rectangular shape and is perpendicular to one lateral side of the rectangular shape.

According to first to sixth exemplary embodiments, the opening OPN has a closed shape when viewed in a plan view, but the embodiments are not limited thereto. That is, the opening OPN of the texture control electrode TCE may be open in one direction.

In addition, although the exemplary embodiments disclose texture control electrodes TCE having an integral structure, the texture control electrode TCE may alternatively be divided into a plurality of texture control electrodes TCE as long as they are electrically connected to each other.

Figure 16:
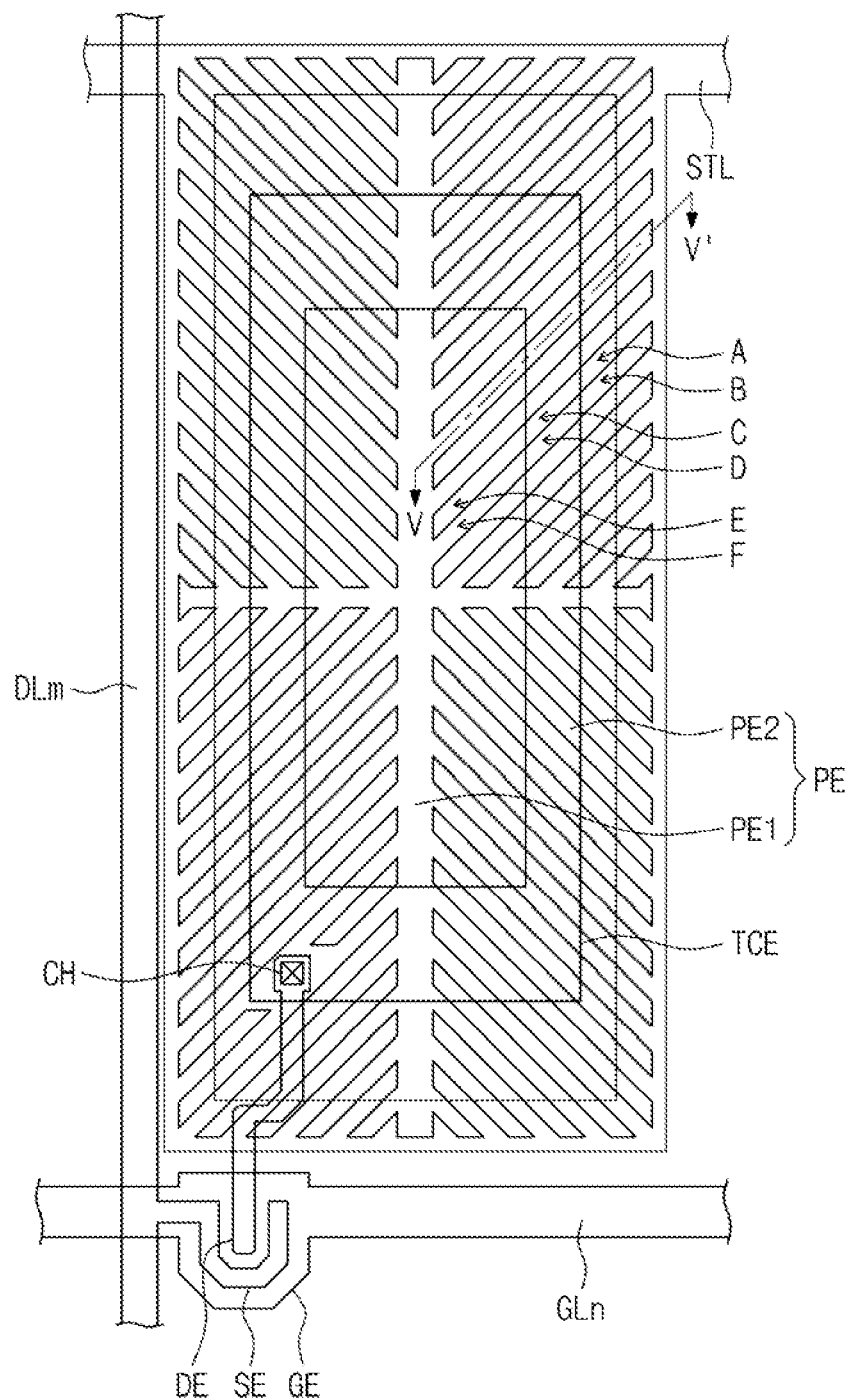
FIG. 16 is a plan view showing an LCD according to a seventh exemplary embodiment.
Figure 17A:
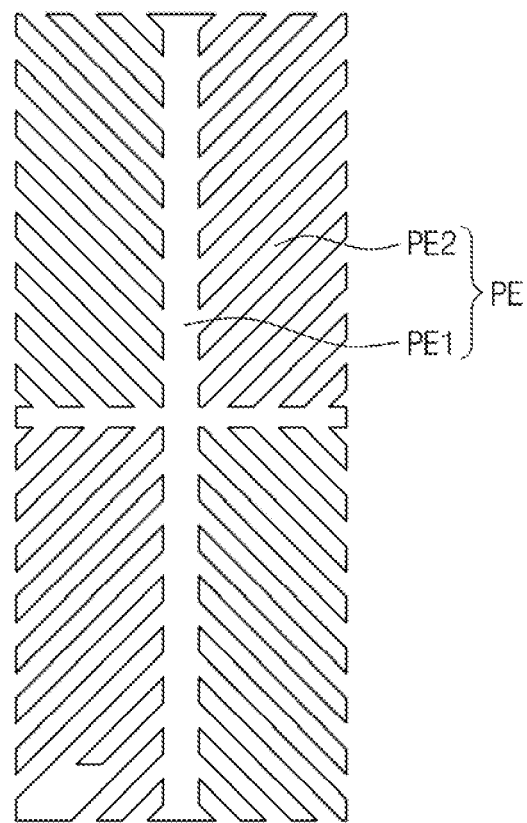
FIGS. 17A and 17B are plan views showing a part of an LCD according to a seventh exemplary embodiment.
Figure 17B:
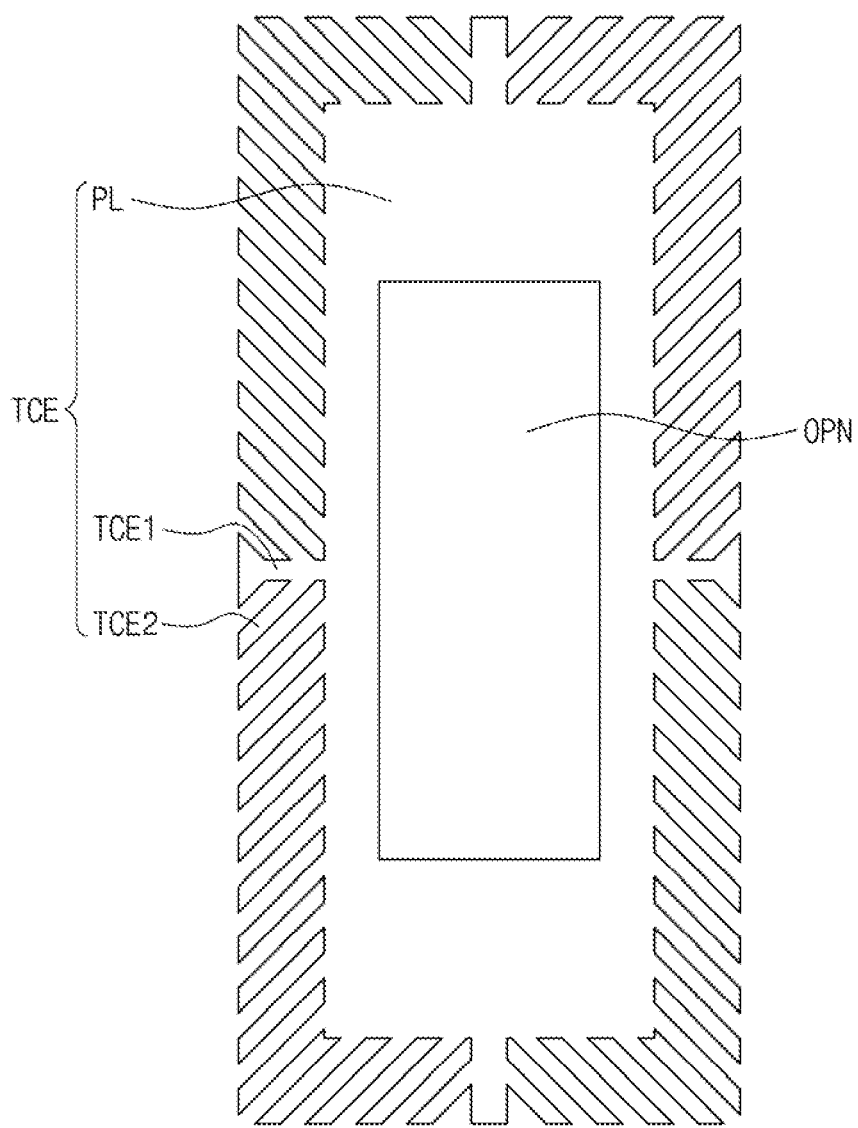
Figure 18:
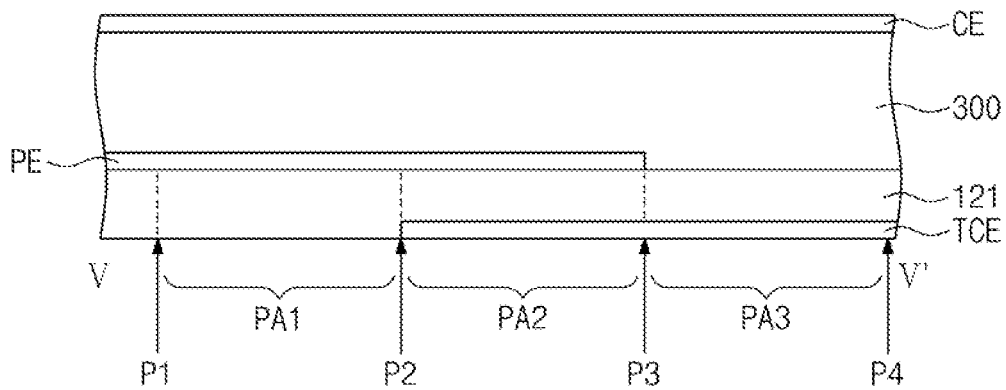
FIG. 18 is a sectional view taken along line V-V' of FIG. 16.

FIG. 16 is a plan view showing an LCD according to a seventh exemplary embodiment. FIGS. 17A and 17B are plan views showing the pixel electrode PE and the texture control electrode TCE of the LCD according to a seventh exemplary embodiment. FIG. 18 is a sectional view taken along line V-V' of FIG. 16.

The following description of a seventh exemplary embodiment will be focused on the difference with respect to the first exemplary embodiment to avoid redundancy, and, unless otherwise expressed, the technical features of the first exemplary embodiment will be adopted in a seventh exemplary embodiment. The same or similar reference numerals will be used to refer to the same or similar elements.

According to first to sixth exemplary embodiments, the entire texture control electrode TCE substantially overlaps with the pixel electrode PE except for a part of the edge of the texture control electrode TCE. However, according to a seventh exemplary embodiment, the overlapped portion between the pixel electrode PE and the texture control electrode TCE is different from that of first to sixth exemplary embodiments, thereby further reducing the texture defect.

Referring to FIGS. 16, 17A, 17B and 18, the pixel electrode PE and the texture control electrode TCE are divided into a first region PA1, a second region PA2 and a third region PA3 according to the overlap size therebetween. A position where the stem part PE1 of the pixel electrode PE meets the branch parts PE2 is indicated as a first position P1, a boundary between the first and second regions PA1 and PA2 is indicated as a second position P2, a boundary between the second and third regions PA2 and PA3 is indicated as a third position P3, and a terminal end of the branch parts of the texture control electrode TCE is indicated as a fourth position P4.

The pixel electrode PE is provided in the first and second regions PA1 and PA2, and the texture control electrode TCE is provided in the second and third regions PA2 and PA3. That is, the first region PA1 is provided with only the pixel electrode PE, the second region PA2 is provided with the pixel electrode PE and the texture control electrode TCE, and the third region PA3 is provided with only the texture control electrode TCE.

The pixel electrode PE includes the stem part PE1 and a plurality of branch parts PE2 extending from the stem part PE1. The stem part PE1 and the branch parts PE2 extend through the first region PA1 and the second region PA2.

The texture control electrode TCE (FIG. 17B) includes a plate part PL, a stem part TCE1 and a plurality of branch parts TCE2. The plate part PL covers the whole area of the second region PA2. The plate part PL includes an opening OPN through which the insulating layer 111 corresponding to the first region PA1 is exposed. The stem part TCE1 of the texture control electrode TCE extends from the plate part PL to the third region PA3 along the extension direction of the stem part PE1 of the pixel electrode PE. The branch parts TCE2 of the texture control electrode TCE extend from the plate part PL or the stem part TCE1 through the third region PA3 along the extension direction of (i.e., overlapping) the branch parts PE2 of the pixel electrode PE or substantially in parallel with the extension direction of the branch parts PE2 of the pixel electrode PE.

In the LCD having the above structure, if the voltage is applied to the pixel electrode PE and the texture control electrode TCE, the electric field applied to the liquid crystal layer 300 located along the edges of the pixel electrode PE and the texture control electrode TCE is initially distorted. Thus, the liquid crystal molecules subject to the electric field in this location are primarily rotated, i.e., rotated as a direct result of distortions in the electric field, and then the liquid crystal molecules adjacent to the primarily rotated liquid crystal molecules are sequentially rotated.

Figure 19A:
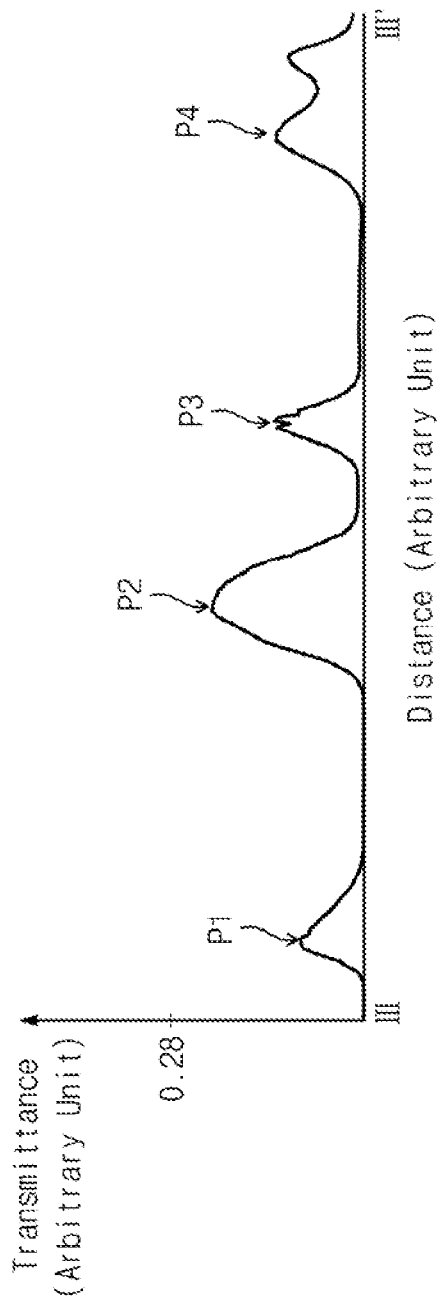
FIGS. 19A and 19B are graphs showing transmittance as a function of time after a voltage has been applied in an LCD according to a seventh exemplary embodiment.
Figure 19B:
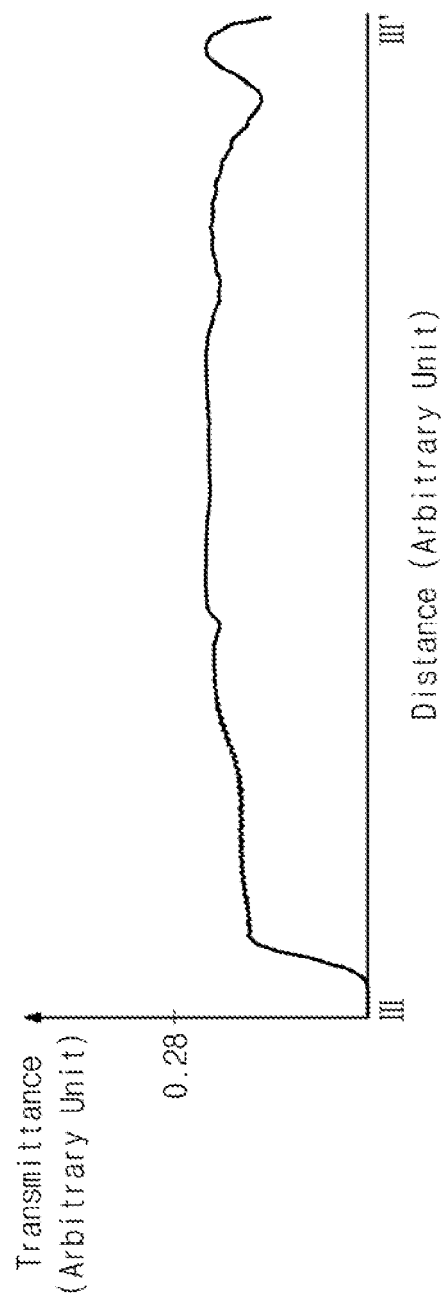

FIGS. 19A and 19B are graphs showing the transmittance obtained the LCD according to a seventh exemplary embodiment when time after the voltage has been applied to both the pixel electrode PE and the texture control electrode TCE has elapsed by 10 ms and 50 ms, respectively.

Referring to FIG. 19A, when time after the voltage has been applied to both the pixel electrode PE and the texture control electrode TCE has elapsed by 10 ms, the transmittance at the first and third positions P1 and P3 corresponding to the edge of the pixel electrode PE, and the transmittance at the second and fourth positions P2 and P4 corresponding to the edge of the texture control electrode TCE are higher than the transmittance of other regions. The higher transmittance for the liquid crystal layer 300 indicates that the electric field of the liquid crystal layer 300 is primarily changed at the edge of the pixel electrode PE and the edge adjacent to the opening OPN of the texture control electrode TCE. In detail, the liquid crystal molecules located along the edge of the pixel electrode PE and the edge adjacent to the opening OPN of the texture control electrode TCE are primarily rotated.

Referring to FIG. 19B, when time after the voltage has been applied to both the pixel electrode PE and the texture control electrode TCE has elapsed by 50 ms, the higher transmittance is represented over the whole area corresponding to the pixel electrode PE, which indicates that most liquid crystal molecules located over the pixel electrode PE have been rotated.

As shown in FIGS. 19A and 19B, according to a seventh exemplary embodiment, the edge of the texture control electrode TCE is located between the stem part PE1 and the branch parts PE2 of the pixel electrode PE to provide a region in which the liquid crystal molecules are primarily rotated. Thus, the liquid crystal molecules located along the edge of the texture control electrode TCE between the stem part PE1 and the branch parts PE2 of the pixel electrode PE may primarily rotate (be initially rotated by the alteration in the electric field at that location) and then the liquid crystal molecules located in the region formed with the pixel electrode PE may rotate.

Figure 20A:
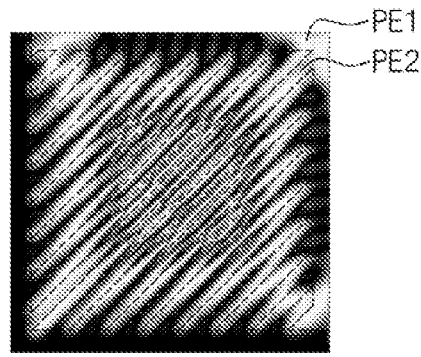
FIGS. 20A, 20B, 21A, 21B, 22A and 22B are photographs showing transmittance as a function of time in a conventional LCD and an LCD according to a seventh exemplary embodiment.
Figure 20B:
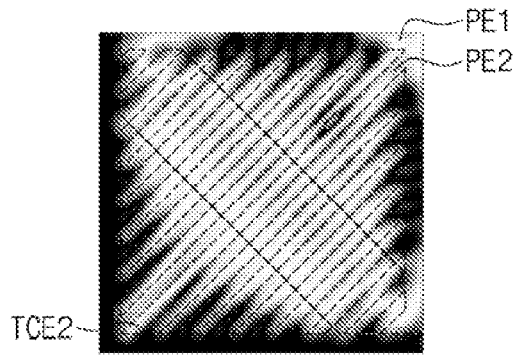
Figure 21A:
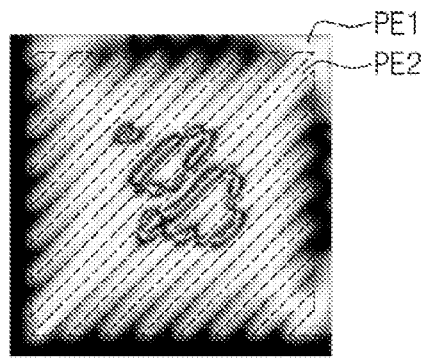
Figure 21B:
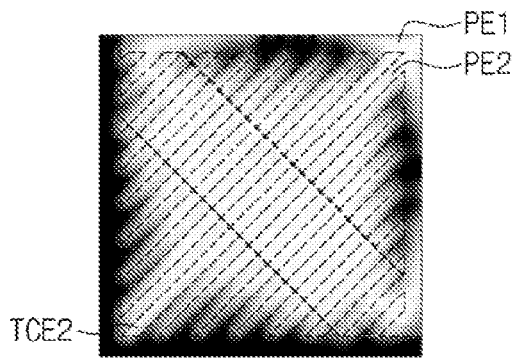
Figure 22A:
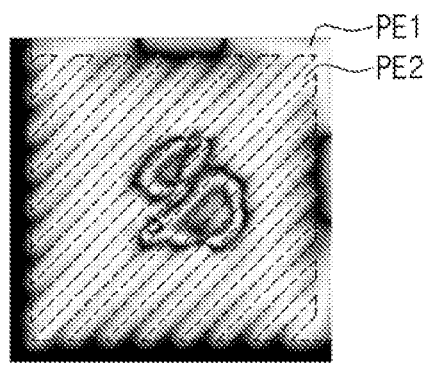
Figure 22B:
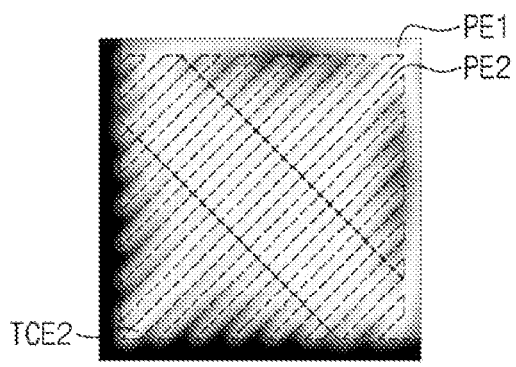

FIGS. 20A, 20B, 21A, 21B, 22A and 22B are photographs showing transmittance as a function of time in the conventional LCD and the LCD according to the seventh exemplary embodiment, which are obtained from a part of the pixel. FIGS. 20A and 20B show the transmittance when 20 ms has elapsed after the voltage was applied, FIGS. 21A and 21B show the transmittance when 50 ms has elapsed after the voltage was applied, and FIGS. 22A and 22B show the transmittance when 100 ms has elapsed after the voltage was applied.

The pixel is divided into first to third regions PA1 to PA3 according to the alignment of the pixel electrode PE and the texture control electrode TCE. The conventional LCD includes the pixel electrode manufactured through the conventional method. The structure of the seventh exemplary embodiment was identical to the structure of the conventional LCD except that the pixel electrode in the conventional LCD had the texture control electrode TCE. In addition, the conventional LCD was manufactured and driven under the same conditions as the LCD according to the seventh exemplary embodiment. In the LCD according to the seventh exemplary embodiment, the ratio ($V_2/V_1$) of the second effective voltage to the first effective voltage was 0.83.

Referring to FIGS. 20A, 21A and 22A, similar to FIGS. 8A and 8B, the texture defect occurs in the conventional LCD between the stem part and the terminal ends of the branch parts of the pixel electrode. That is, when the electric field is applied to the liquid crystal layer of the conventional LCD, a non-transmittive region is formed by the liquid crystal layer located in the region between the stem part and the terminal ends of the branch parts of the pixel electrode. The non-transmittive region, which causes the texture defect, is irregularly formed between the stem part and terminal ends of the branch parts of the pixel electrode regardless of the shape of the pixel electrode. In addition, in the conventional LCD, the misalignment of the liquid crystal molecules is not corrected even when time elapses.

Referring to FIGS. 20B, 21B and 22B, the LCD according to the seventh exemplary embodiment presents uniform transmittance over the whole area of the pixel without causing the texture defect.

Although not shown in the drawings of the pixel electrode PE and the texture control electrode TCE, the extension direction of the branch parts PE2 of the pixel electrode PE may deviate from the extension direction of the branch parts TCE2 of the texture control electrode TCE due to the misalignment in the manufacturing process. However, the transmittance is not significantly changed even when the branch parts PE2 of the pixel electrode PE are spaced apart from the branch parts TCE2 of the texture control electrode TCE by up to a maximum of 3 μm.

Figure 23:
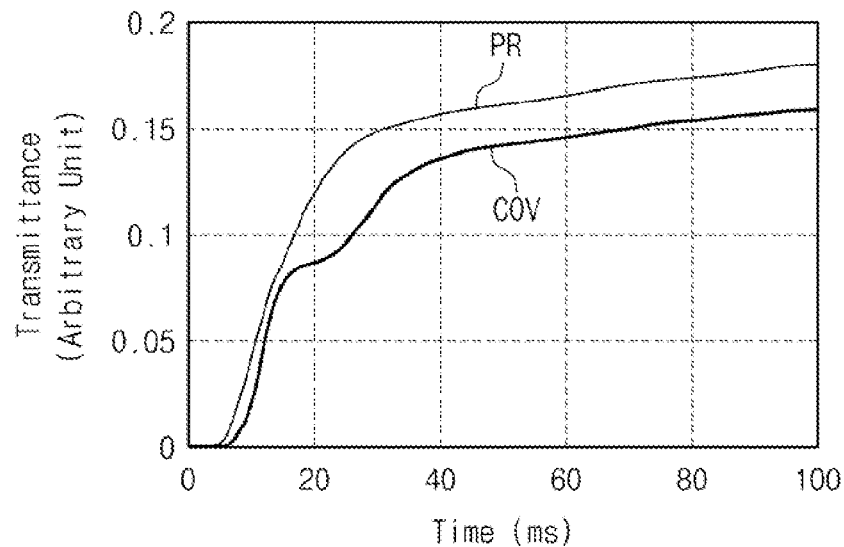
FIG. 23 is a graph showing transmittance of a conventional LCD and an LCD according to a seventh exemplary embodiment, which is represented in an arbitrary unit.

FIG. 23 is a graph showing the transmittance of the conventional LCD (PR) and the LCD (COV) according to the seventh exemplary embodiment, (transmittance is represented in an arbitrary unit). The conventional LCD includes the pixel electrode manufactured through the conventional method. The structure of the conventional LCD is identical to the structure of the LCD according to the seventh exemplary embodiment except that (1) the pixel electrode in the conventional LCD has a different shape from that of the pixel electrode PE according to the seventh exemplary embodiment, and (2) there is no texture control electrode TCE. In addition, the conventional LCD is manufactured and driven under the same conditions as the LCD according to the seventh exemplary embodiment.

Referring to FIG. 23, the transmittance of the conventional LCD is lower than that of the LCD according to the seventh exemplary embodiment because some of the liquid crystal molecules are not controlled under the electric field, that is, the light is blocked due to the texture defect.

Figure 24:
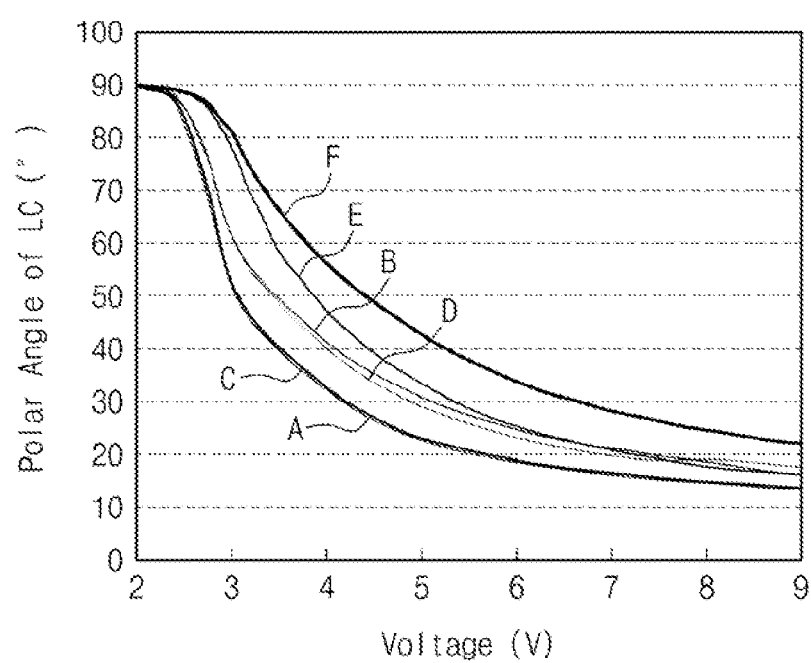
FIG. 24 is a view showing polar angles of liquid crystal molecules for A to F positions in an LCD according to a seventh exemplary embodiment.

FIG. 24 is a graph showing polar angles of liquid crystal molecules LC for various positions A to F in the LCD according to the seventh exemplary embodiment as a function of applied voltage. The polar angles are measured under the condition that the ratio ($V_2/V_1$) of the second effective voltage $V_2$ to the first effective voltage $V_1$ is 0.83.

The positions A to F in the LCD are identified in FIG. 16. Position A is between the adjacent branch parts TCE2 of the texture control electrode TCE in the third region PA3, position B is above the branch parts TCE2 of the texture control electrode TCE in the third region PA3, position C is between the adjacent branch parts PE2 of the pixel electrode PE in the second region PA2, position D is above the branch parts PE2 of the pixel electrode PE in the second region PA2, position E is between the adjacent branch parts PE2 of the pixel electrode PE in the first region PA1, and position F is above the branch parts PE2 of the pixel electrode PE in the first region PA1.

Referring to FIGS. 16 and 24, the liquid crystal molecules aligned in positions located on the pixel electrode PE and the texture control electrode TCE may have polar angles that are different from each other. In detail, the polar angle in the position A is substantially identical to the polar angle in the position C, and the polar angle in the position B is greater than the polar angle in the positions A and C. The polar angle in the position D is similar to the polar angle in the position B, and the polar angle in the position E is greater than the polar angle in the positions A to D. In addition, the polar angle in the position F is greater than the polar angle in the position E.

Therefore, the polar angles of the liquid crystal molecules can be adjusted according to the formation, shape and position of the pixel electrode PE and the texture control electrode TCE. In addition, the polar angles of the liquid crystal molecules can be adjusted according to the voltage applied to the pixel electrode PE and the texture control electrode. TCE. Therefore, according to a seventh exemplary embodiment, the liquid crystal molecules can be easily controlled, so that the transmittance and the viewing angle can be easily controlled.

According to a seventh exemplary embodiment, the terminal ends of the branch parts PE2 of the pixel electrode PE and the plate part PL of the texture control electrode TCE that overlaps with the terminal ends of the branch parts PE2 have substantially rectangular shapes, and the opening OPN has a rectangular shape. However, according to other exemplary embodiments, the opening OPN and the terminal ends of the branch parts PE2 may have various shapes other than the rectangular shape.

Figure 25A:
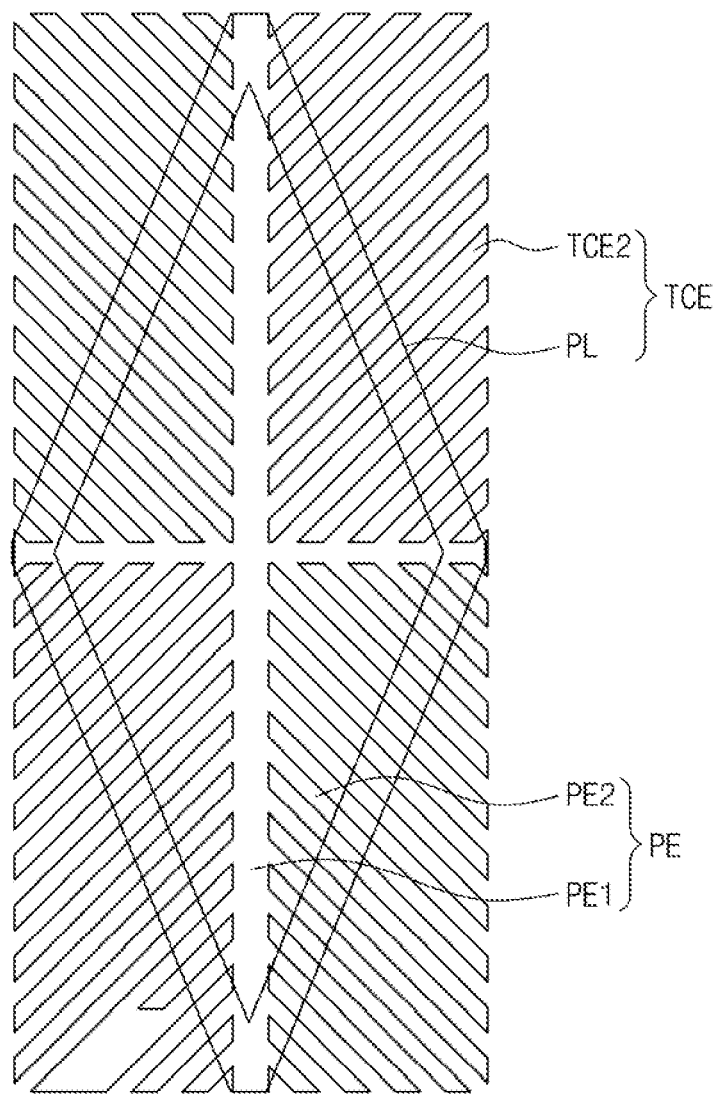
FIGS. 25A and 25B are views showing LCDs according to eighth and ninth exemplary embodiments, respectively.
Figure 25B:
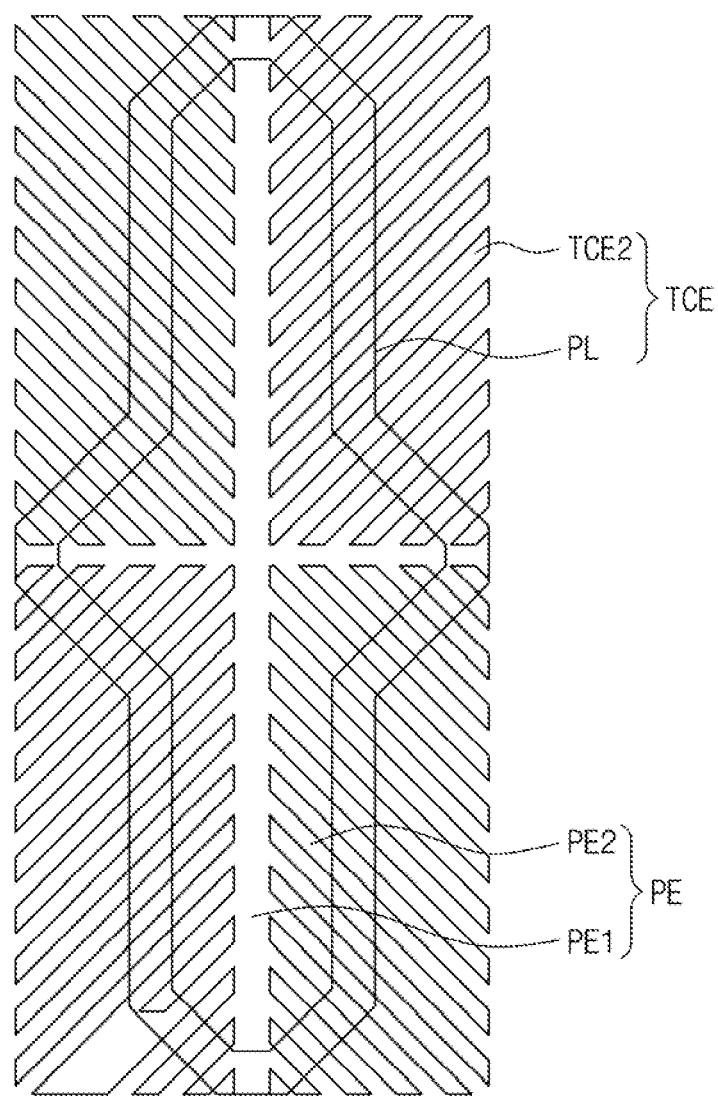

FIGS. 25A and 25B are views showing LCDs according to eighth and ninth exemplary embodiments, respectively. For the purpose of convenience, only the pixel electrode PE and the texture control electrode TCE are shown in FIGS. 25A and 25B.

Referring to FIGS. 25A and 25B, the terminal ends of the branch parts PE2 of the pixel electrode PE and the plate part PL of the texture control electrode TCE that overlap the terminal ends of the branch parts PE2 have a polygonal shape, which is symmetrical about the extension direction of the stem part PE1 of the pixel electrode PE.

According to the exemplary embodiment, the second and third points P1 and P2 are provided between the stem part PE1 of the pixel electrode PE and the terminal ends of the branch parts TCE2 of the texture control electrode TCE. Thus, the liquid crystal molecules aligned between the stem part PE1 of the pixel electrode PE and the terminal ends of the branch parts TCE2 of the texture control electrode TCE can be easily controlled even if the area of the pixel is increased.

Figure 26:
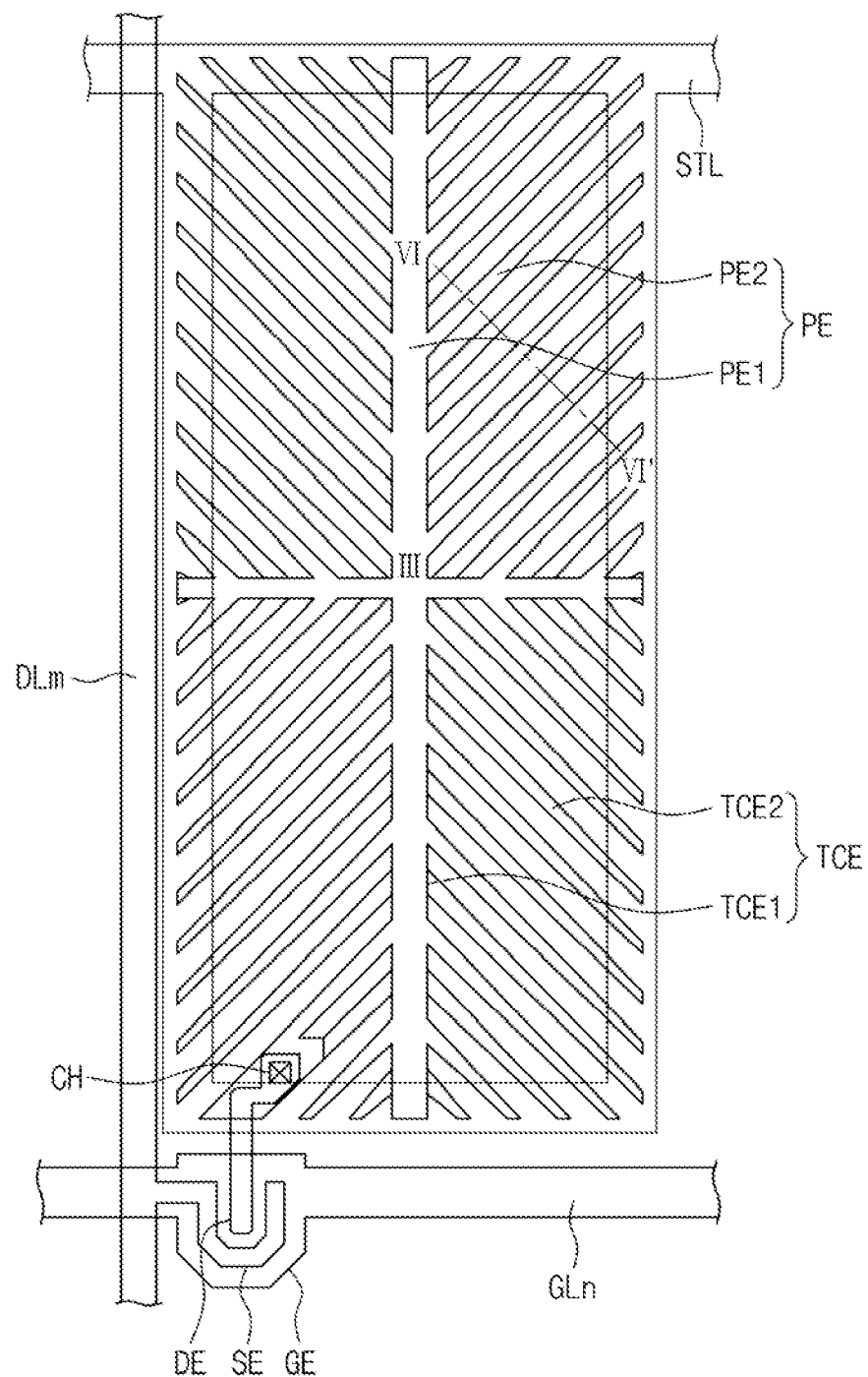
FIG. 26 is a plan view showing an LCD according to a tenth exemplary embodiment.
Figure 27A:
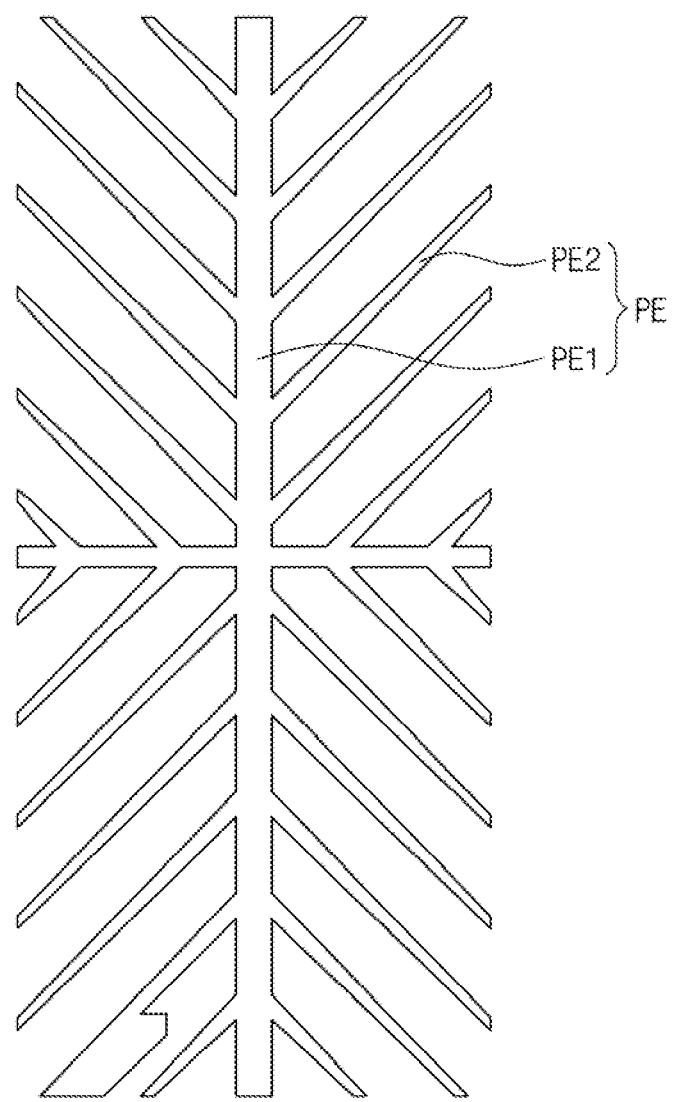
FIGS. 27A and 27B are plan views showing an LCD according to a tenth exemplary embodiment.
Figure 27B:
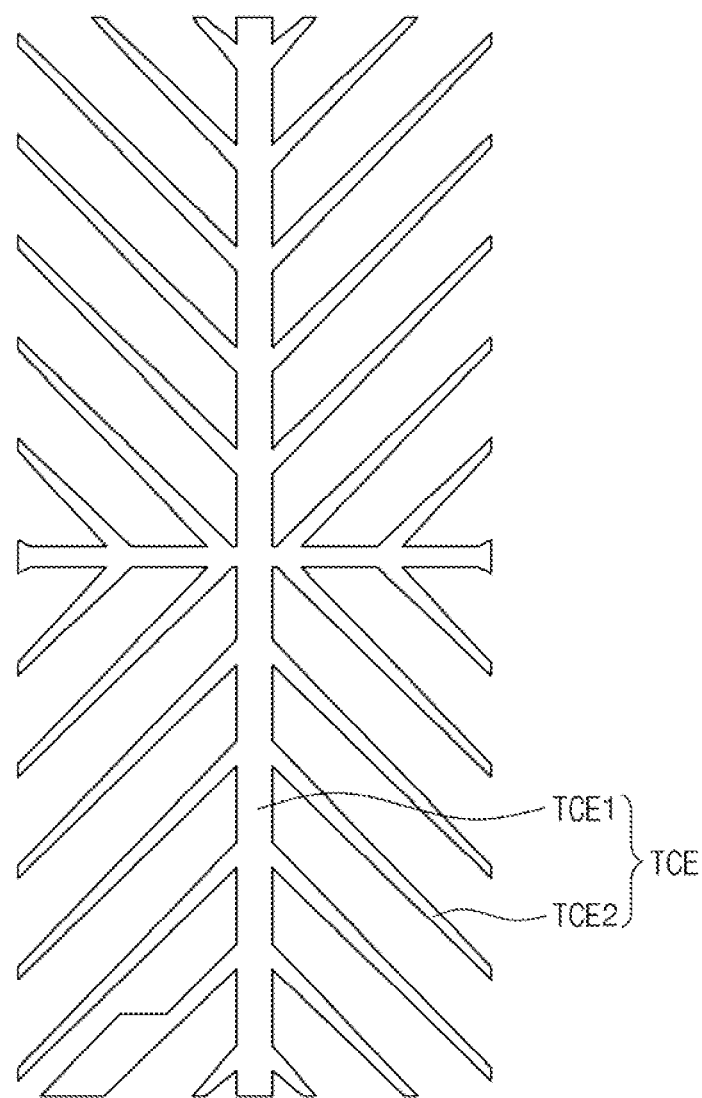
Figure 28:
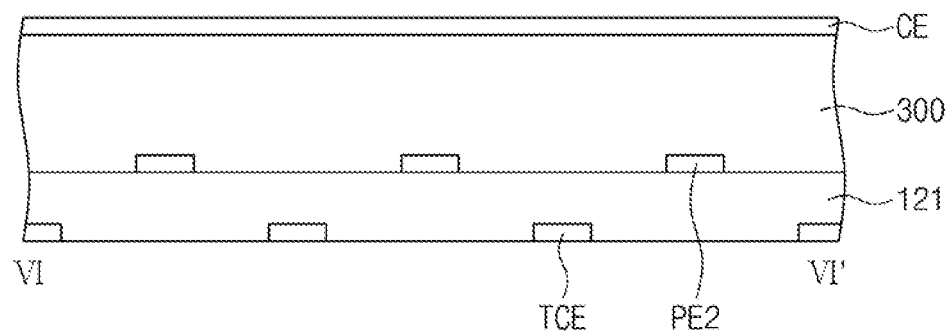
FIG. 28 is a sectional view taken along line VI-VI' of FIG. 26.

FIG. 26 is a plan view showing an LCD according to a tenth exemplary embodiment. FIGS. 27A and 27B are plan views showing the LCD according to a tenth exemplary embodiment, in which only the pixel electrode PE and the texture control electrode TCE are illustrated. FIG. 28 is a sectional view taken along line VI-VI' of FIG. 26 to illustrate a part of the LCD according to a tenth exemplary embodiment.

The following description of a tenth exemplary embodiment will be focused on the difference with respect to the first embodiment to avoid redundancy. The tenth embodiment may be applicable for the structure shown in the sixth exemplary embodiment. Unless otherwise expressed, the technical features of the first embodiment of will be adopted in the tenth exemplary embodiment. The same or similar reference numerals will be used to refer to the same or similar elements.

In the LCD according to a tenth exemplary embodiment, the overlapping part between the pixel electrode PE and the texture control electrode TCE is different from that of the first to ninth exemplary embodiments. According to a tenth exemplary embodiment, the pixel electrode PE includes a stem part PE1 and a plurality of branch parts PE2 branching off from the stem part PE1. In addition, the texture control electrode TCE includes a stem part TCE1 and a plurality of branch parts TCE2 branching off from the stem part TCE1.

The branch parts PE2 and TCE2 of the pixel electrode PE and the texture control electrode TCE may have the same width in the extension direction thereof, but the exemplary embodiment is not limited thereto. The width may be gradually reduced from the stem parts PE1 and TCE1 to terminal ends of the branch parts PE2 and TCE2. FIG. 26 shows the branch parts PE2 and TCE2 in which the width is gradually reduced from the stem parts PE1 and TCE1 to terminal ends of the branch parts PE2 and TCE2.

The stem part PE1 of the pixel electrode PE overlaps the stem part TCE1 of the texture control electrode TCE. When viewed in a plan view, the branch parts PE2 of the pixel electrode PE extend substantially in parallel to the branch parts TCE2 of the texture control electrode TCE, which are adjacent to the branch parts PE2 of the pixel electrode PE. In addition, when viewed in a plan view, the branch parts PE2 of the pixel electrode PE and the branch parts TCE2 of the texture control electrode TCE are alternately aligned with each other.

In addition, because the branch parts PE2 and TCE2 of the pixel electrode PE and the texture control electrode TCE have widths that gradually reduce from the stem parts PE1 and TCE1 to the terminal ends of the branch parts PE2 and TCE2, the edges of the branch parts PE2 and TCE2 are slightly inclined in the extension direction of the branch parts PE2 and TCE2 at a predetermined angle.

According to the LCD having the above structure, the electric field is easily changed due to the branch parts PE2 and TCE2 of the pixel electrode PE and the texture control electrode TCE, respectively, which are alternately aligned with each other, so that the liquid crystal molecules can be easily controlled.

Figure 29A:
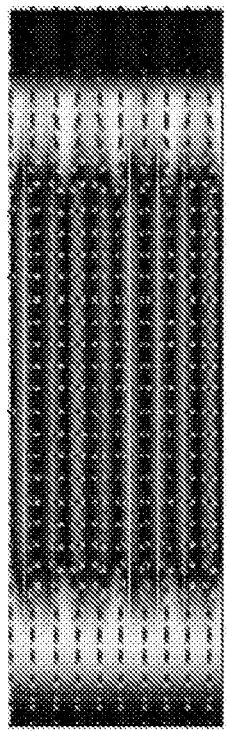
FIGS. 29A, 29B, 30A, 30B, 31A and 31B are photographs showing the simulation results for the alignment and transmittance of liquid crystal molecules in a conventional LCD and an LCD according to a tenth exemplary embodiment.
Figure 29B:
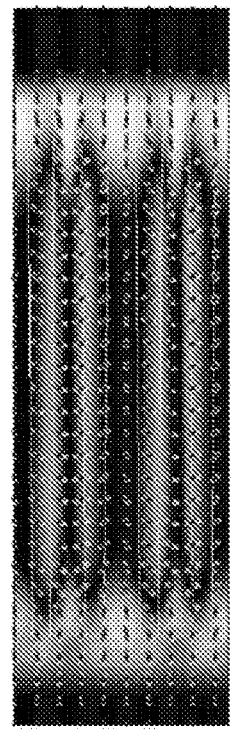
Figure 30A:
Figure 30B:
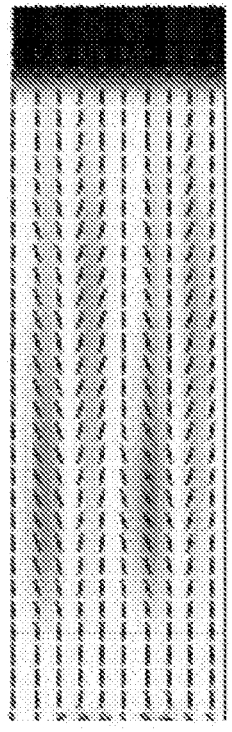
Figure 31A:
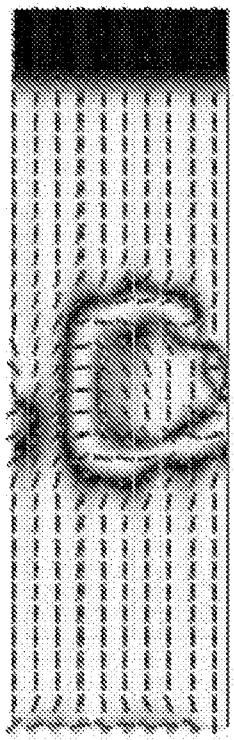

FIGS. 29A, 29B, 30A, 30B, 31A and 31B are photographs showing the result calculated on a computer simulation model for the transmittance as a function of time in a conventional LCD and the LCD according to the tenth exemplary embodiment, which is obtained from a part of the pixel. FIGS. 29A and 29B show the transmittance when time after the voltage has been applied has elapsed by 20 ms, FIGS. 30A and 30B show the transmittance when time after the voltage has been applied has elapsed by 50 ms, and FIGS. 31A and 32B show the transmittance when time after the voltage has been applied has elapsed by 100 ms.

The conventional LCD includes the pixel electrode manufactured through the conventional method. The conventional LCD has the structure identical to the structure of the LCD according to the tenth exemplary embodiment except that (1) the pixel electrode of the conventional LCD has a different shape from that of the pixel electrode PE according to the tenth exemplary embodiment and (2) there is no texture control electrode TCE. In addition, the conventional LCD is manufactured and driven under the same conditions of the LCD according to the tenth exemplary embodiment. In the LCD according to the tenth exemplary embodiment, the ratio ($V_2/V_1$) of the second effective voltage to the first effective voltage is 0.83.

Referring to FIGS. 29A, 30A, and 31A, the texture defect does not occur in the conventional LCD when the time after the electric field has been applied has elapsed by 20 ms. The texture defect does occur between the stem part and the terminal ends of the branch parts of the pixel electrode in the conventional LCD when the time after the electric field has been applied has elapsed by 50 ms. That is, when the electric field is applied to the liquid crystal layer 300 of the conventional LCD, a non-transmittive region is formed at the liquid crystal layer 300 corresponding to the region between the stem part and terminal ends of the branch parts of the pixel electrode.

Figure 31B:
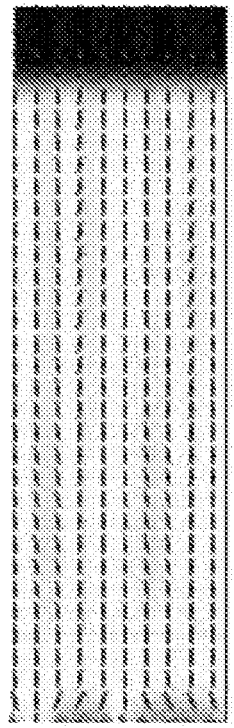

Referring to FIGS. 29B, 30B, and 31B, when the time after the electric field has been applied has elapsed by 20 ms, high transmittive regions and low transmittive regions are alternately formed between adjacent branch parts PE2 and TCE2 in parallel to the branch parts PE2 and TCE2 in the LCD according to the tenth exemplary embodiment due to the rotation of some liquid crystal molecules aligned between the branch parts PE2 and TCE2. However, the high transmittive regions and low transmittive regions are removed when the time has elapsed by 50 ms, so that the uniform transmittance is achieved over the whole area of the pixel without the texture defect.

According to a tenth exemplary embodiment, the width of the branch parts PE2 and TCE2 are gradually reduced from the stem part to the terminal ends of the branch parts PE2 and TCE2. Therefore, the branch parts PE2 and TCE2 are slightly inclined from the extension direction of the branch parts PE2 and TCE2, a slope is formed in the branch parts PE2 and TCE2.

Because the branch parts PE2 and TCE2 are configured with a slope, additional electric field distortion may occur, so that the liquid crystal molecules can be easily aligned along the edges of the pixel electrode PE and the texture control electrode TCE. If the width of the terminal ends of the branch parts PE2 and TCE2 is excessively narrow, the alignment force for the liquid crystal molecules aligned between the adjacent branch parts PE2 and TCE2 may be reduced, so that the transmittance may be lowered. Thus, the slope angle must be appropriately adjusted depending on the length of the branch parts PE2 and TCE2.

Figure 32:
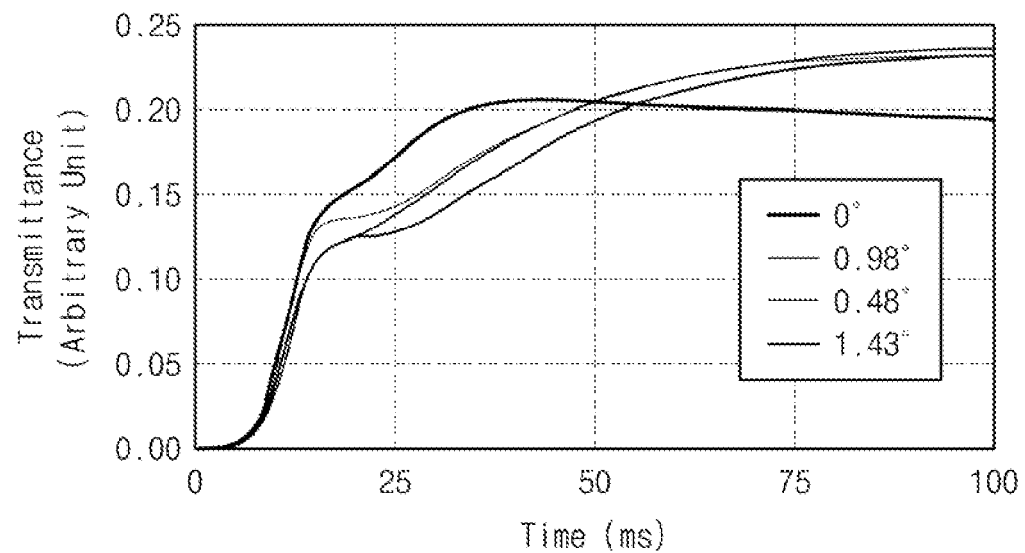
FIG. 32 is a graph showing how transmittance depends on the shape of a pixel electrode and a texture control electrode in an LCD according to a tenth exemplary embodiment.

FIG. 32 is a graph showing the transmittance of the LCD according to a tenth exemplary embodiment when the slope angle is adjusted to a state in which a distance between the branch parts PE2 and TCE2 of the pixel electrode PE and the texture control electrode TCE is constantly maintained as 6 μm.

Referring to FIG. 32, in the case in which a slope is not formed in the branch parts PE2 and TCE2, the higher transmittance is represented when the time after the voltage has been applied has elapsed by 25 ms, as compared with the case in which a slope is formed in the branch parts PE2 and TCE2. However, when the time after the voltage has been applied has elapsed by 50 ms, the transmittance is lowered if the slope is not formed in the branch parts PE2 and TCE2, which indicates that the number of the liquid crystal molecules that can be easily rotated increases due to the slope, and the transmittance is increased due to the rotated liquid crystal molecules.

Figure 33:
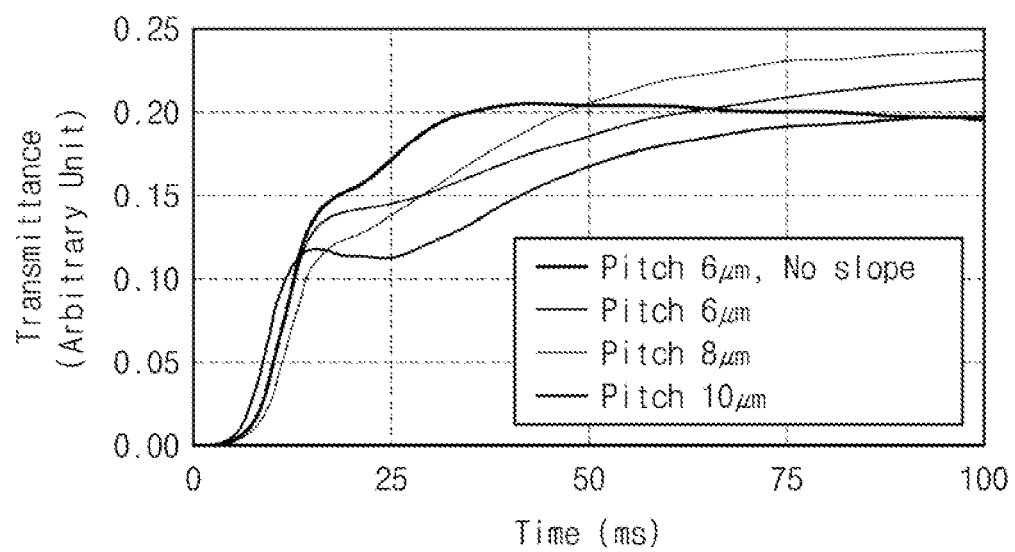
FIG. 33 is another graph showing how transmittance depends on the shape of a pixel electrode and a texture control electrode in an LCD according to a tenth exemplary embodiment.

FIG. 33 is a graph showing transmittance as the distance between adjacent branch parts PE2 and TCE2 is varied where the branch parts PE2 and TCE2 are configured with slope angle that is fixed to 0.96°.

Referring to FIG. 33, in the case in which the branch parts PE2 and TCE2 have no slope and the distance between adjacent branch parts PE2 and TCE2 is 6 μm, when the time after the voltage has been applied has elapsed by 25 ms, a higher transmittance is present as compared with the case in which the slope is formed in the branch parts PE2 and TCE2. However, when the time after the voltage has been applied has elapsed by 50 ms to 80 ms, a lower transmittance is present if the slope is not formed in the branch parts PE2 and TCE2. Accordingly, transmittance is relatively high if the slope is formed in the branch parts PE2 and TCE2. In addition, transmittance is relatively high as the distance between adjacent branch parts PE2 and TCE2 becomes narrow. Thus, the liquid crystal molecules can be more easily controlled by forming a slope in the branch parts PE2 and TCE2 while minimizing the distance between adjacent branch parts PE2 and TCE2.

According to a tenth exemplary embodiment, the branch parts PE2 of the pixel electrode PE and the branch parts TCE2 of the texture control electrode TCE are alternately aligned while being spaced apart from each other. However, if the additional electric field distortion is possible, the arrangement of the branch parts PE2 and TCE2 may be changed. According to an eleventh exemplary embodiment, the branch parts PE2 of the pixel electrode PE partially overlap with the branch parts TCE2 of the texture control electrode TCE.

Figure 34:
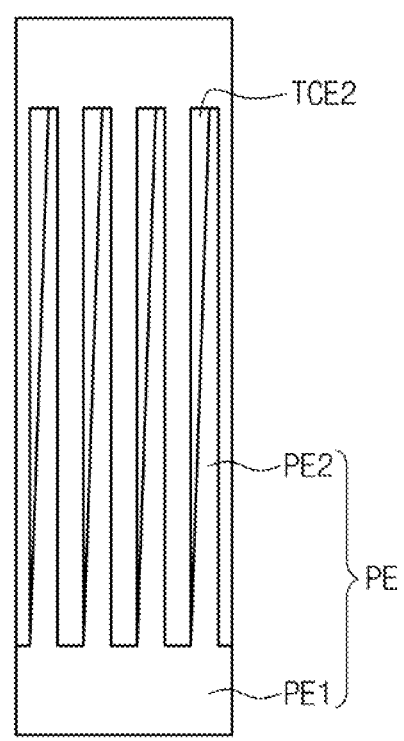
FIG. 34 is a view showing a simulation structure for an LCD according to an eleventh exemplary embodiment.

FIG. 34 is a view showing a structure for an LCD for a computer simulation model according to an eleventh exemplary embodiment, in which only the pixel electrode PE and the texture control electrode TCE are illustrated.

In an LCD according to an eleventh exemplary embodiment, the overlapping part between the pixel electrode PE and the texture control electrode TCE is different from the overlapping part according to first to tenth exemplary embodiments.

Referring to FIG. 34, the pixel electrode PE includes a stem part PE1 and a plurality of branch parts PE2 branching off from the stem part PE1. In addition, the texture control electrode TCE includes a stem part TCE1 and a plurality of branch parts TCE2 branching from the stem part TCE1. The stem part PE1 of the pixel electrode PE overlaps with the stem part TCE1 of the texture control electrode TCE. According to an eleventh exemplary embodiment, each branch part PE2 of the pixel electrode PE partially overlaps with each branch part TCE2 of the texture control electrode TCE. Thus, when viewed in a plan view, a part of the edge of each branch part TCE2 of the texture control electrode TCE is located between adjacent branch parts PE2 of the pixel electrode PE. Thus, when the voltage is applied, the part of the edges of the branch parts PE2 and TCE2 of the two electrodes distorts the electric field between adjacent branch parts PE2 and TCE2. Thus, the rotation of the liquid crystal molecules can be easily controlled by the branch parts PE2 and TCE2 of the pixel electrode PE and the texture control electrode TCE.

Figure 35A:
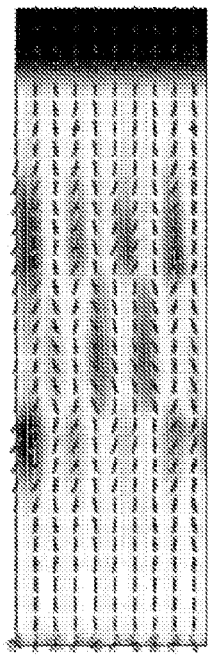
FIGS. 35A, 35B and 35C are photographs showing the simulation result for the alignment and transmittance of liquid crystal molecules in an LCD according to an eleventh exemplary embodiment.
Figure 35B:
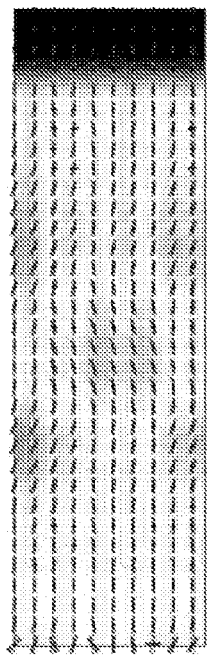
Figure 35C:
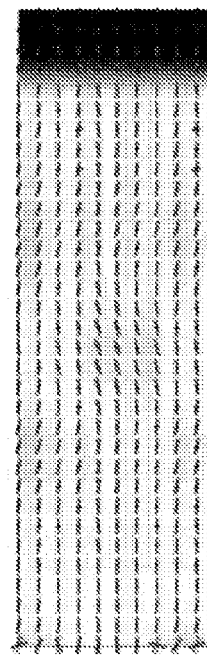

FIGS. 35A, 35B and 35C are photographs showing the transmittance of the LCD according to the eleventh exemplary embodiment when the time after the electric field has been applied has elapsed by 20 ms, 50 ms and 100 ms, respectively.

Referring to FIGS. 35A, 35B and 35C, when the time has elapsed by 20 ms, the low-transmittive region and high-transmittive region are formed between the branch parts PE2 of the pixel electrode PE and the branch parts TCE2 of the texture control electrode TCE. That is, the region where the electric field is distorted may have the high transmittance and the region where the electric field is not distorted may have the low transmittance. However, the high transmittive region and low transmittive region are removed when the time has elapsed by 50 ms, so that the uniform transmittance is present over the whole area of the pixel without the texture defect.

As described above, according to the embodiments, an LCD having no texture defects can be provided.

Therefore, the alignment material, such as the reactive mesogen used to easily control the liquid crystal molecules, may not be necessary. Because the reactive mesogen is produced through the electric field exposure process, the embodiments can simplify the manufacturing process and reduce the manufacturing cost by omitting the reactive mesogen.

Although the exemplary embodiments have been described, it is understood that the present invention should not be limited to these exemplary embodiments but various changes and modifications can be made by one ordinary skilled in the art within the spirit and scope of the present disclosure.

For instance, only the difference with respect to the first exemplary embodiment has been described in third to eleventh exemplary embodiments on the assumption that the same voltage is applied to the pixel electrode and the texture control electrode. The present invention is not limited thereto. Similar to the second exemplary embodiment, the voltage applied to the pixel electrode may be different from the voltage applied to the texture control electrode.

What is claimed is:

1. A liquid crystal display comprising:
   a first substrate;
   a first pixel electrode formed on the first substrate, the first pixel electrode including a stem part and a plurality of branch parts branching off from the stem part, the stem part including a vertical section and a horizontal section crossing the vertical section;
   a second pixel electrode overlapping with at least a part of the first pixel electrode and including at least one elongated opening, wherein an edge of the at least one elongated opening crosses a portion of the plurality of branch parts at a position along the branch parts closer to a middle of the branch parts between the stem part and an outer edge of the first pixel than to the stem part or to the outer edge of the first pixel;
   a passivation layer interposed between the first pixel electrode and the second pixel electrode;
   a second substrate; and
   a liquid crystal layer including vertically aligned liquid crystal molecules between the first and second substrates,
   wherein a first effective voltage $V_1$ applied to the liquid crystal layer by the first pixel electrode is different from a second effective voltage $V_2$ applied to the liquid crystal layer by the second pixel electrode.

2. The liquid crystal display of claim 1, wherein a voltage applied to the first pixel electrode is a first voltage, a voltage applied to the second pixel electrode is a second voltage, the first effective voltage is applied to the liquid crystal layer when the first voltage is applied to the first pixel electrode, the second effective voltage is applied to the liquid crystal layer when the second voltage is applied to the second pixel electrode, and the first and second effective voltages satisfy $0.3V_1 < V_2 < 0.9V_1$.

3. The liquid crystal display of claim 2, wherein the first voltage has a level identical to a level of the second voltage.

4. The liquid crystal display of claim 3, further comprising a thin film transistor connected to the first and second pixel electrodes and configured to output a data signal in response to a gate signal, wherein the first and second pixel electrodes are respectively charged with voltages by receiving the data signal.

5. The liquid crystal display of claim 4, wherein the liquid crystal layer is formed on the second pixel electrode, wherein the first voltage is identical to the first effective voltage and the second effective voltage is defined by a following equation 1:

$$V_2 = V_t \left(1 + \frac{d_p/d_{LC}}{\varepsilon_p/\varepsilon_{LC}}\right)^{-1} \quad \text{Equation 1}$$

wherein $V_t$ is the second voltage, $d_{LC}$ is a thickness of the liquid crystal layer, $\varepsilon_p$ is a dielectric constant of the passivation layer, $d_p$ is a thickness of the passivation layer, and $\varepsilon_{LC}$ is a dielectric constant of the liquid crystal layer.

6. The liquid crystal display of claim 5, wherein the passivation layer comprises at least one of an organic insulating layer and an inorganic insulating layer and has a thickness of about 0.4 μm to about 5 μm.

7. The liquid crystal display of claim 6, wherein the passivation layer comprises an inorganic insulating layer, and the inorganic insulating layer comprises SiNx and has a thickness of about 0.9 μm to about 5 μm.

8. The liquid crystal display of claim 6, wherein the passivation layer comprises an organic insulating layer, and the organic insulating layer has a thickness of about 0.45 μm to about 3 μm.

9. The liquid crystal display of claim 2, wherein the first voltage has a level different from a level of the second voltage.

10. The liquid crystal display of claim 9, further comprising first and second thin film transistors configured to output a data signal in response to a first gate signal, wherein the first pixel electrode is connected to the first thin film transistor to be charged with the first voltage by receiving the data signal, and the second pixel electrode is connected to the second thin film transistor to be charged with the second voltage by receiving the data signal.

11. The liquid crystal display of claim 10, further comprising a voltage adjusting module that adjusts the first and second voltages according to a second gate signal, which is generated after the first gate signal.

12. The liquid crystal display of claim 11, wherein the first substrate comprises a plurality of pixels and each pixel comprises:
a first gate line receiving the first gate signal;
a second gate line receiving the second gate signal; and
a data line receiving the data signal.

13. The liquid crystal display of claim 12, wherein the voltage adjusting module comprises:
a third thin film transistor having a source electrode connected to a drain electrode of the second thin film transistor and outputting a voltage control signal in response to the second gate signal;
a charge sharing electrode connected to a drain electrode of the third thin film transistor and charged with a voltage by receiving the voltage control signal;
a storage line overlapping with the charge sharing electrode,
wherein the passivation layer is interposed between the storage line and the charge sharing electrode to adjust the first and second voltages.

14. The liquid crystal display of claim 1, wherein the terminal ends of the branch parts are spaced apart from outer edges of the second pixel electrode by at least 3 μm.

15. The liquid crystal display of claim 1, wherein a shape of the second pixel electrode has a line symmetry about the stem part.

16. The liquid crystal display of claim 1, wherein some of the edges of the second pixel electrode are substantially parallel to a lengthwise direction of the stem part.

17. The liquid crystal display of claim 1, wherein the second pixel electrode further includes a first region overlapping the part of the first pixel electrode and a second region surrounding the first region.

18. The liquid crystal display of claim 17, wherein the second pixel electrode further includes a plate part, a stem part extending from the plate part, and a plurality of branch parts branching off from the stem part, in which the plate part is provided in the first region, and the branch parts are provided in the second region.

19. The liquid crystal display of claim 18, wherein the first pixel electrode comprises a first pixel stem part and a plurality of first pixel branch parts branching off from the first pixel stem part, and the plate part partially overlaps the first pixel branch parts of the first pixel electrode.

20. The liquid crystal display of claim 19, wherein the branch parts of the second pixel electrode correspond to the first pixel branch parts of the first pixel electrode in one-to-one correspondence and extend along a lengthwise direction of the first pixel branch parts of the first pixel electrode.

21. The liquid crystal display of claim 1, wherein the second pixel electrode further includes a stem part and a plurality of branch parts branching off from the stem part.

22. The liquid crystal display of claim 21, wherein the first pixel electrode comprises a first pixel stem part and a plurality of first pixel branch parts branching off from the first pixel stem part, and wherein the first pixel stem part of the first pixel electrode at least partially overlaps with the stem part of the second pixel electrode, and the first pixel branch parts of the first pixel electrode are aligned alternately with the branch parts of the second pixel electrode.

23. The liquid crystal display of claim 22, wherein the branch parts of the first pixel electrode have widths that become gradually smaller as the distance away from stem part along the branch part becomes greater.

24. The liquid crystal display of claim 22, wherein the first pixel stem part of the first pixel electrode overlaps the stem part of the second pixel electrode, and the first pixel branch parts of the first pixel electrode partially overlap corresponding branch parts of the second pixel electrode.

25. The liquid crystal display of claim 1, wherein the second substrate comprises a second insulating substrate and a common electrode formed on the second insulating substrate.

* * * * *